(12) United States Patent
Woodruff et al.

(10) Patent No.: US 8,256,092 B1
(45) Date of Patent: Sep. 4, 2012

(54) METHOD FOR HELICAL BORING

(75) Inventors: David C. Woodruff, Morrow, OH (US);
Nils David Oehlund, Fair Lawn, NJ (US); Gareth Wayne Mason, Ross on Wye (GB)

(73) Assignees: Makino Inc., Mason, OH (US); AB Sandvik Coromant, Sandviken (SE)

( * ) Notice: Subject to any disclaimer, the term of this patent is extended or adjusted under 35 U.S.C. 154(b) by 735 days.

(21) Appl. No.: 12/362,706

(22) Filed: Jan. 30, 2009

Related U.S. Application Data

(60) Provisional application No. 61/024,678, filed on Jan. 30, 2008.

(51) Int. Cl.
*B23P 13/00* (2006.01)
*B21K 3/00* (2006.01)
*B21D 53/00* (2006.01)

(52) U.S. Cl. .................... 29/557; 29/888.01; 409/200

(58) Field of Classification Search ............. 29/407.01, 29/407.05, 557, 888.01, 888.076; 409/200
See application file for complete search history.

(56) References Cited

U.S. PATENT DOCUMENTS

| | | | |
|---|---|---|---|
| 1,397,167 A | 11/1921 | Hopper | |
| 1,734,908 A | 11/1929 | Jeffries | |
| 2,878,800 A | 3/1959 | Burrell | |
| 2,969,718 A | 1/1961 | Frank | |
| 4,125,057 A * | 11/1978 | Cox | 409/74 |
| 4,194,322 A | 3/1980 | Giardini | |
| 4,380,990 A | 4/1983 | Giardini | |
| 4,398,407 A | 8/1983 | DeFay, Jr. | |
| 4,896,638 A | 1/1990 | Shepley | |
| 5,197,836 A * | 3/1993 | Crivellin | 409/200 |
| 5,224,804 A | 7/1993 | Shepley | |
| 5,251,408 A | 10/1993 | Boaz | |
| 5,309,800 A | 5/1994 | Yuhara | |
| 5,361,470 A | 11/1994 | Hamada et al. | |
| 5,396,821 A | 3/1995 | Okumura et al. | |
| 5,417,130 A | 5/1995 | Dorsch | |
| 5,423,717 A | 6/1995 | Boaz | |
| 5,429,459 A * | 7/1995 | Palm | 409/66 |
| 5,482,415 A | 1/1996 | Belaga et al. | |
| 5,501,189 A | 3/1996 | Van Bezeij | |
| 5,540,526 A | 7/1996 | Hyatt et al. | |

(Continued)

OTHER PUBLICATIONS

Georgiou, George; "Machining Solutions for Compacted Graphite Iron"; Machine Shop Guide Web Archive—Jan./Feb. 2002; originally presented at the 2001 Global Power Train Congress.

(Continued)

*Primary Examiner* — Jermie Cozart
(74) *Attorney, Agent, or Firm* — Frost Brown Todd LLC

(57) ABSTRACT

A tool may be used to form an engine cylinder bore in a compacted graphite iron workpiece using helical interpolation. The tool may be rotated about a first axis while orbiting about a second axis that is parallel to the first axis. While rotating and orbiting, the tool may be advanced into the workpiece. This helical interpolation may be used to successively engage cutting or honing elements of the tool with the workpiece. The elements may thereby be permitted to cool between each successive engagement, which may reduce wear on the tool. Various operating parameters associated with the process may have certain relationships that may be exploited in certain ways to obtain ideal results. For instance, a helical interpolation process may be used to perform an act of rough cutting on the workpiece and finish honing on the workpiece, without having to perform an intermediary step of semi-finish boring.

34 Claims, 16 Drawing Sheets

U.S. PATENT DOCUMENTS

| | | | | |
|---|---|---|---|---|
| 5,694,819 | A | 12/1997 | Hormansdorfer | |
| 5,713,253 | A | 2/1998 | Date et al. | |
| 5,768,962 | A | 6/1998 | Link et al. | |
| 5,775,853 | A | 7/1998 | Keefer et al. | |
| 5,855,698 | A | 1/1999 | Gu | |
| 5,873,684 | A * | 2/1999 | Flolo | 409/66 |
| 5,876,155 | A | 3/1999 | Link et al. | |
| 5,893,683 | A | 4/1999 | Johnson | |
| 5,960,687 | A | 10/1999 | Rohrberg | |
| 5,971,678 | A | 10/1999 | Linderholm | |
| 6,048,140 | A | 4/2000 | Johnson | |
| 6,062,117 | A | 5/2000 | Shoji | |
| 6,073,524 | A | 6/2000 | Weiss et al. | |
| 6,081,980 | A | 7/2000 | Lunn | |
| 6,128,985 | A | 10/2000 | Muster et al. | |
| 6,147,468 | A | 11/2000 | Hamamura et al. | |
| 6,158,311 | A | 12/2000 | Watkins et al. | |
| 6,178,637 | B1 | 1/2001 | Herold et al. | |
| 6,227,082 | B1 | 5/2001 | Hormansdorfer et al. | |
| 6,270,295 | B1 | 8/2001 | Hyatt et al. | |
| 6,491,481 | B1 * | 12/2002 | Border et al. | 409/131 |
| 6,533,508 | B1 | 3/2003 | Nonaka | |
| 6,565,298 | B2 | 5/2003 | Ishida et al. | |
| 6,601,484 | B1 | 8/2003 | Katoh et al. | |
| 6,631,771 | B2 | 10/2003 | Hamamura et al. | |
| 6,663,327 | B2 | 12/2003 | Linderholm et al. | |
| 6,702,531 | B2 | 3/2004 | Linderholm | |
| 6,705,184 | B2 | 3/2004 | Cardemon et al. | |
| 6,728,595 | B2 | 4/2004 | Hamamura et al. | |
| 6,729,810 | B2 | 5/2004 | Hyatt et al. | |
| 6,746,550 | B1 | 6/2004 | Hollinger | |
| 6,761,096 | B1 | 7/2004 | Kochsiek | |
| 6,773,211 | B2 * | 8/2004 | Zackrisson et al. | 409/132 |
| 6,821,063 | B2 | 11/2004 | Debat et al. | |
| 6,840,722 | B1 | 1/2005 | Nonaka | |
| 6,869,259 | B2 | 3/2005 | Lebkuechner | |
| 6,872,036 | B2 | 3/2005 | Linderholm | |
| 6,877,936 | B2 * | 4/2005 | Linderholm et al. | 408/1 R |
| 6,902,360 | B2 | 6/2005 | Meece et al. | |
| 6,979,154 | B2 * | 12/2005 | Mina | 407/113 |
| 7,029,209 | B2 | 4/2006 | Cardemon et al. | |
| 7,074,360 | B2 | 7/2006 | Wolven | |
| 7,089,662 | B2 * | 8/2006 | Izquierdo et al. | 29/888.061 |
| 7,090,445 | B2 | 8/2006 | Woodruff et al. | |
| 7,165,430 | B2 | 1/2007 | Weidmer | |
| 7,189,038 | B2 | 3/2007 | Stuxberg et al. | |
| 7,237,989 | B2 | 7/2007 | Glaesser | |
| 7,272,877 | B2 | 9/2007 | Cardemon et al. | |
| 7,384,219 | B2 | 6/2008 | Weidmer | |
| 7,478,982 | B2 | 1/2009 | Fuhst et al. | |
| 7,627,940 | B2 | 12/2009 | Amirehteshami | |
| 7,674,079 | B2 | 3/2010 | Schawe | |
| 7,717,018 | B2 | 5/2010 | Kato et al. | |
| 7,774,918 | B2 | 8/2010 | Ainsworth | |
| 7,803,034 | B2 | 9/2010 | Camp et al. | |
| 8,021,089 | B2 | 9/2011 | Eriksson et al. | |
| 8,083,444 | B2 | 12/2011 | Schawe | |
| 8,087,857 | B2 | 1/2012 | Schawe | |
| 2003/0012615 | A1 * | 1/2003 | Linderholm et al. | 409/132 |
| 2003/0017017 | A1 * | 1/2003 | Linderholm et al. | 409/190 |
| 2004/0244758 | A1 | 12/2004 | Weng et al. | |
| 2006/0219066 | A1 * | 10/2006 | Nicholl et al. | 82/1.11 |

OTHER PUBLICATIONS

Hoffman, Tom; "Thinning Out: High-Feed Milling Cutters Can Reduce Machining Time in Roughing Applications"; Cutting Tool Engineering Magazine; vol. 57, No. 4; Apr. 2005.

Georgiou, George; "Iron Engines May Be in Your Future: Compacted Graphite Iron is Top Prospect"; printed from www.manufacturingcenter.com/tooling/archives/0903/0903iron.asp on Apr. 25, 2005.

Woodruff, David; "Why Compacted Graphite Iron?: New Metal Cutting Developments Make Application Now Practical"; Competitive Production; vol. 3, No. 2; 2006.

* cited by examiner

| | Outputs | Inputs | |
|---|---|---|---|
| $R_w = D_w/2$ | 50.000 | 100.000 | <= Dw (Dia. workplace) |
| $R_m = D_m/2$ | 51.000 | 102.000 | <= Dm (Dia. machined) |
| $R_c = D_c/2$ | 42.000 | 84.000 | <= Dc (Dia. Cutter) |

| | |
|---|---|
| $a = R_w$ | 50.000 |
| $b = R_m - R_c$ | 9.000 |
| $c = R_c$ | 42.000 |
| $s = (a+b+c)/2$ | 50.500 |
| $K = \sqrt{s \cdot [s-a] \cdot [s-b] \cdot [s-c]}$ | 94.377 |
| (sin of acute angles only) | |

| | | Degrees |
|---|---|---|
| $\sin(A) = 2K/(b \cdot c)$ | 0.499 | 29.96 |
| $\sin(B) = 2K/(a \cdot c)$ [Ref only!] | 0.090 | 5.16 |
| $\sin(C) = 2K/(a \cdot b)$ [Ref only!] | 0.419 | 24.80 |

| | |
|---|---|
| $b' = c \cos(A)$ | 36.389 |
| True $A_e = R_m - b - b'$ | 5.611 |

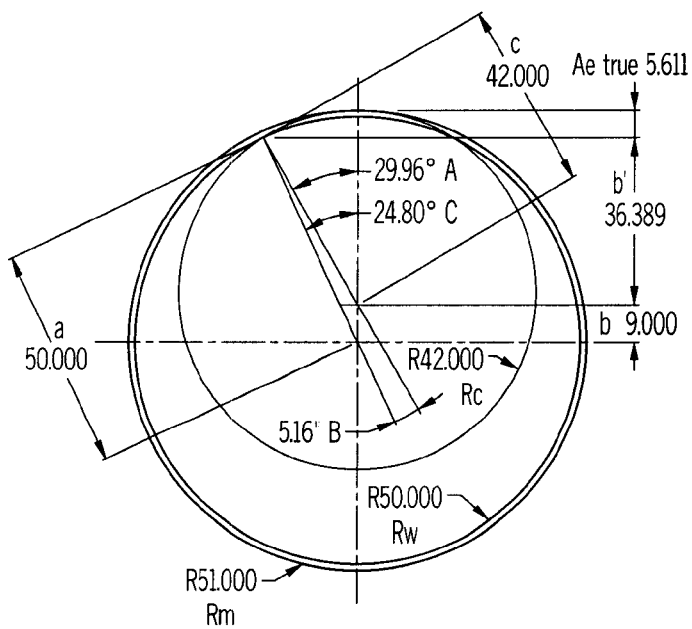

$a = R_w = 50.000$
$b = R_m - R_c = 51.000 - 42.000 = 9.000$
$c = R_c = 42.000$
$s = (a+b+c)/2 = 50.500$
$K = \text{SQRT}(s \cdot [s-a] \cdot [s-b] \cdot [s-c]) = 94.377$
(sin (acute angles only!))
$\sin(A) = 2K/(b \cdot c) = 0.499 \ [A=29.96°]$
$\sin(b) = 2K/(a \cdot c) = 0.090$ Ref only!
$\sin(c) = 2K/(a \cdot b) = 0.419$ Ref only!
$lo' = c \cos(A) = 36.389$
$A_e \text{ true} = R_m - b - b' = 5.611$

FIG. 4

METHOD FOR HELICAL BORING

PRIORITY

This application claims priority from the disclosure of U.S. Provisional Patent Application Ser. No. 61/024,678, entitled "System and Method for Helical Boring," filed Jan. 30, 2008, the disclosure of which is incorporated by reference herein in its entirety.

BACKGROUND

Over the years, engine blocks have been made from a variety of materials. For instance, some blocks for diesel engines or other engine parts may be made from compacted graphite iron (CGI), the material properties of which are well known. In some instances, the properties of CGI may present issues during the production of such engine blocks or other parts. In particular, some conventional tools and/or machining systems may wear relatively quickly when used during operations (e.g., boring of cylinders) on CGI engine blocks or other parts. Processes using such tools on CGI workpieces may otherwise yield unsatisfactory results when compared to the same use of such tools and processes on workpieces formed of other materials. While a variety of systems and methods have been made and used for machining or otherwise working on workpieces such as engine blocks, it is believed that no one prior to the inventors has made or used the invention described in the appended claims.

BRIEF DESCRIPTION OF THE DRAWINGS

While the specification concludes with claims which particularly point out and distinctly claim the invention, it is believed the present invention will be better understood from the following description of certain examples taken in conjunction with the accompanying drawings, in which like reference numerals identify the same elements and in which:

FIG. 4 depicts an exemplary calculation of a radial depth of cut;

DETAILED DESCRIPTION

The following description of certain examples of the invention should not be used to limit the scope of the present invention. Other examples, features, aspects, embodiments, and advantages of the invention will become apparent to those skilled in the art from the following description, which is by way of illustration, one of the best modes contemplated for carrying out the invention. As will be realized, the invention is capable of other different and obvious aspects, all without departing from the invention. Accordingly, the drawings and descriptions should be regarded as illustrative in nature and not restrictive.

The systems and methods of the embodiments described herein are discussed in the context of forming cylinders in a CGI engine block (e.g., for a diesel engine). However, it will be appreciated that the systems and methods described herein may also be used to perform other types of boring operations, operations other than boring (e.g., reaming, finishing, etc.), operations on workpieces other than engine blocks, and operations on workpieces formed of materials other than CGI (e.g., gray iron, ductile iron, etc.). The systems and methods described herein may also be used to perform acts on the exterior of a workpiece, such as creating external profiles, or elsewhere. By way of example only, the systems and methods described herein may be used to form involute scrolls for a scroll compressor, which would include internal and external profiles. To the extent that alternative uses and applications are not explicitly described herein, such alternative uses and applications will be apparent to those of ordinary skill in the art in view of the teachings herein.

Figure 1:
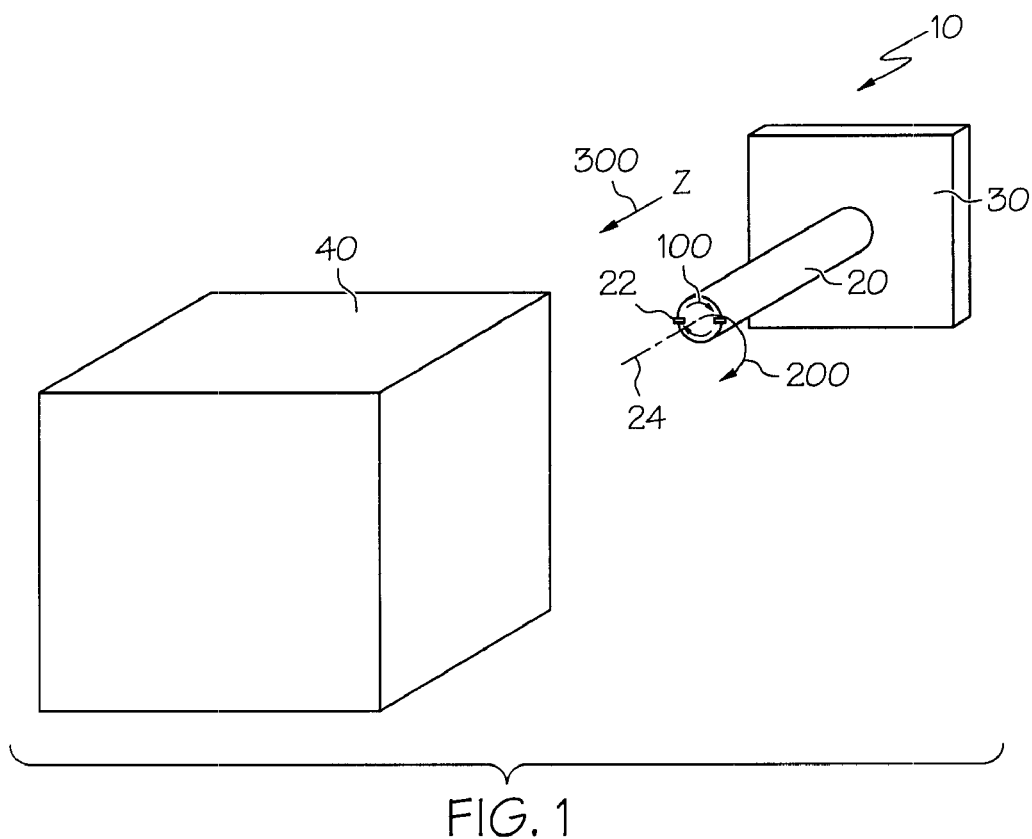
FIG. 1 depicts a partial perspective view of a boring tool system in a helical interpolation process.

As shown in FIG. 1, an exemplary tool system (10) comprises a tool (20) coupled with a base portion (30). In some versions, tool (20) is coupled with base portion (30) via a rotatable spindle (not shown). In particular, base portion (30) is operable to rotate tool (20) about a tool axis (24) and also move tool (20) in an orbital/helical motion as described in greater detail below. It will be appreciated that tool system (10) may be provided within a machining center (not shown), and may further comprise a plurality of additional components (not shown) or alternative components (not shown). For instance, in one embodiment, the tool system (10) is provided within a "a81" machining center by Makino, Inc. of Cincinnati, Ohio, such as the "a81M." Alternatively, tool system (10) may be provided within a machining station or center such as any of those described in U.S. Pat. Nos. 5,540,526; 5,775,853; 6,270,295; or 6,729,810, the disclosures of all of which are incorporated by reference herein. Other suitable machining centers/stations or physical contexts for tool system (10) will be apparent to those of ordinary skill in the art in view of the teachings herein.

Figure 2:
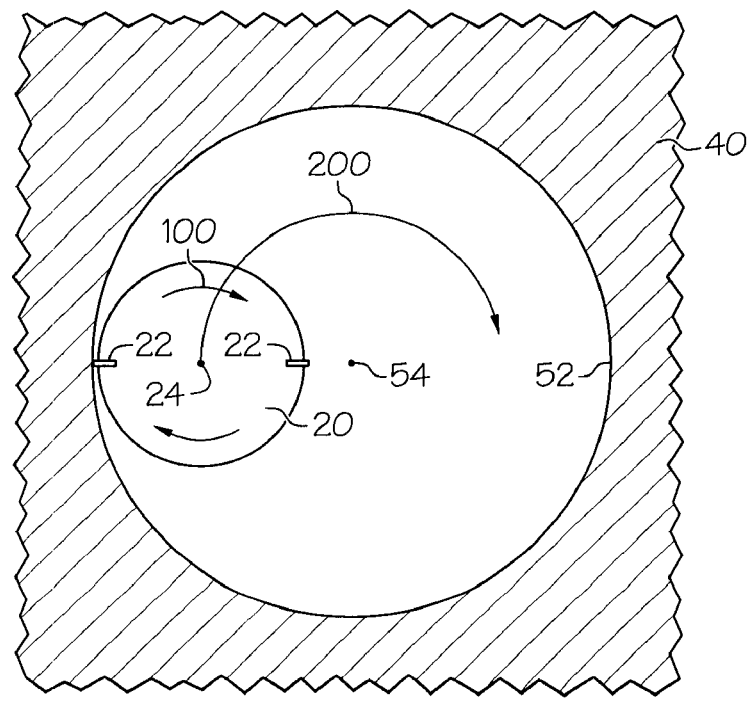
FIG. 2 depicts a partial cross-sectional end view of the tool system of FIG. 1 operating on a workpiece.
Figure 3:
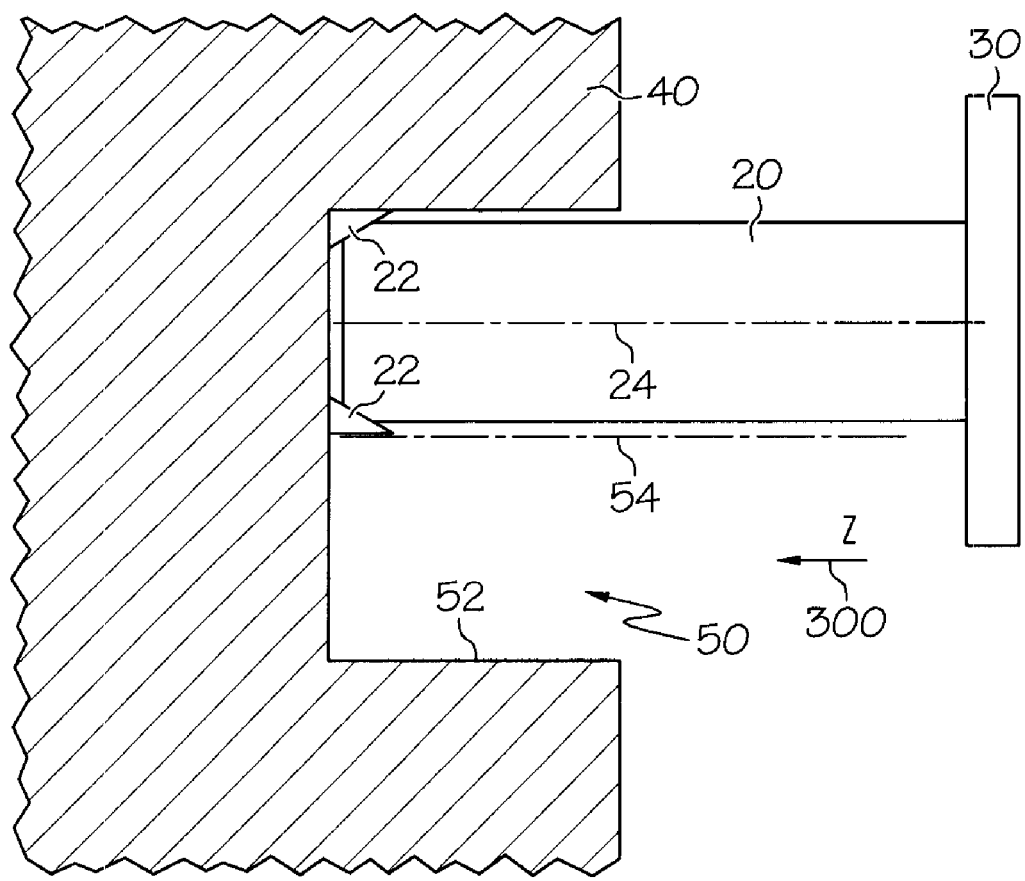
FIG. 3 depicts a partial cross-sectional side view of the tool system of FIG. 1 operating on a workpiece.

As shown in FIGS. 1-3, tool (20) of the present example comprises a plurality of blade members (22). Blade members (22), which may also be referred to as "inserts" among other things, are configured to remove material from a workpiece (40). In FIGS. 1-3, two blade members (22) are shown for illustrative purposes only. It will be appreciated that any suitable number of blade members (22) may be used in any suitable arrangement. For instance, any suitable number of blade members (22) may be provided about the circumference of tool (20). Similarly, any suitable number of blade members (22) may be provided at various longitudinal positions along tool (20). For instance, a plurality of blade members (22) may be provided in a helical arrangement on tool (20), in any desired number of helixes, along any desired length of tool (20), and at any suitable longitudinal and angular spacing and positioning.

In one embodiment, tool (20) comprises a tool provided by AB Sandvik Cormorant of Sweden. In yet another embodiment, tool (20) comprises any of the tools described in U.S. Pat. Nos. 6,270,295; 6,729,810; 7,090,445; or 7,165,430 the disclosures of which are incorporated by reference herein, or any suitable tool provided by Makino, Inc. of Mason, Ohio. Other suitable alternatives for tool (20) will be apparent to those of ordinary skill in the art in view of the teachings herein.

By way of example only, blade members (22) may comprise a "Z90" or a "CoroMill 790 serrated technology endmill" by AB Sandvik Cormorant of Sweden. Blade members (22) may be serrated or have other suitable properties. The position of blade members (22) may be adjustable (e.g., adjustable radial position, adjustable angle relative to radius, etc.), or non-adjustable. Other suitable alternatives for blade members (22) will be apparent to those of ordinary skill in the art in view of the teachings herein.

Tool (20) of the present example is operable to rotate about a tool axis (24), which extends along the center of tool (20). Such rotation is indicated in FIGS. 1 and 2 with arrows (100). In addition, tool (20) is operable to move in an orbital motion while rotating about tool axis (24). Such orbital motion is indicated in FIGS. 1 and 2 with arrow (200). While rotation (100) and orbital motion (200) are shown as being in a clockwise direction, it will be appreciated that processes may be performed with either or both of rotation (100) and orbital motion (200) being in a counter-clockwise direction.

In the present example, during the above-described rotation and orbital motion, tool (20) may also be advanced toward workpiece (40). Such advancement is shown in FIGS. 1 and 3 as being in a "z-direction," which is indicated with arrow (300). In view of the foregoing, it will be appreciated that tool (20) may be introduced to workpiece (40) with a helical interpolation. Such a helical interpolation may be circular, spiral, involute, NURBS, x-y, or have any other suitable properties. In some examples, helical interpolation of tool (20) is provided at a helix angle somewhere within a range of about 40° and about 1°, inclusive of each. For instance, the helix angle may be approximately 30°, approximately 27.5°, approximately 20°, approximately 10°, or approximately 2.1°. Alternatively, any other suitable helix angle may be used. It should also be understood that tool (20) may be orbited at a positive or negative helix angle. For instance, if a negative helix angle is used, cutting action may be initiated where tool (20) is the stiffest and may thus be more stable. It will be appreciated in view of the teachings herein that, as tool (20) is advanced with a helical interpolation into workpiece (40), tool (20) may remove material from workpiece (40) or otherwise work on workpiece (40).

In the present example, workpiece (40) comprises an engine block formed of CGI material, and tool (20) is used to form engine cylinders in workpiece (40) (e.g., as part of the formation of a diesel engine block). An exemplary cylinder is shown in FIGS. 2 and 3 as a bore (50), which has a bore surface (52) and which defines a bore axis (54). With tool (20) rotating about tool axis (24), and tool axis (24) being moved in an orbital motion about bore axis (54), tool (20) is advanced in the z-direction toward workpiece (40), whereupon blade members (22) form bore (50), perform a cutting operation on bore (50) by removing material from workpiece (40), or perform some other work on workpiece (40). Cutting operations performed by tool (20) may include rough cutting, semi-finish cutting, and/or finish cutting, among other types of operations.

As noted above, in some variations, tool (20) has a plurality of blade members (22) provided in a helical arrangement about tool axis (24). Given the helical arrangement of blade members (22), as well as the helical interpolation of tool (20) as tool (20) is passed into workpiece (40), only a single blade member (22) will be engaging workpiece (40) at any given time in the present example. In other words, in the present example, each blade member (22) will be given its own time to "cool down" between successive engagements with workpiece (40). Such "cool down" time may result in blade members (22) having a longer working life than they might otherwise have if they were in contact with workpiece (40) for a greater duration or without time to cool down between instances of contact. The operation that tool (20) performs upon workpiece (40) is thus similar to a milling operation in the present example, in that no single blade member (22) is in continuous contact with workpiece (40) during the process. In other variations, tool (20) is configured such that more than one blade member (20) may contact workpiece (40) at a given time. In still other variations, one or more blade members (22) are in continuous contact with workpiece (40) as tool (20) works upon workpiece (40), though this is not preferred.

It will be appreciated in view of the teachings herein that tool (20) may engage workpiece (40) as tool (20) is advanced in the z-direction (300); and that tool (20) may be disengaged from workpiece (40) when tool (20) is retracted in the reverse of the z-direction (300). Such disengagement may simply be a consequence of tool (20) having removed material from workpiece (40) during advancement of tool (20). In other words, tool (20) may be retracted or withdrawn from workpiece (40) in a helical interpolation that is similar to (e.g., a reversal of) the helical interpolation that was employed during advancement of tool (20) into workpiece (40). Operation can also be just circular, if desired. Alternatively, after tool (20) has been advanced to a desired depth into workpiece (40), helical interpolation of tool (20) may cease, and tool (20) may simply be withdrawn or retracted along a substantially straight line in the reverse of the z-direction (300). Such straight line withdrawal may be performed at the radial/angular position about bore axis (54) that tool (20) was at the end of advancement; or tool (20) may be centered (e.g., such that bore axis (54) and tool axis (24) are coaxial) before tool (20) is withdrawn along a straight line (e.g., along bore axis (54)). In some other versions, as tool (20) is withdrawn from bore (50), tool (20) orbits through a range closer to bore axis (54) than the range at which tool (20) orbits when tool (20) is advanced in bore (50). Still other ways in which tool (20) may be withdrawn from workpiece (40) will be apparent to those of ordinary skill in the art in view of the teachings herein.

In some variations, the workpiece (40) is secured within a machining center by a brace (not shown). Such a brace may reduce or prevent wobbling of workpiece (40) and/or tool (20) as tool (20) removes material from or otherwise works upon workpiece (40). To the extent that workpiece (40) comprises an engine block, such a block may be mounted on the end or face associated with an automobile transmission, and braced accordingly. Alternatively, a block may be mounted on the opposite side or face, on the side or face associated with an automobile oil pan, or otherwise mounted. In addition, one or more dampening elements (not shown) or other structures may be provided. A merely exemplary dampening workpiece (40) holding fixture may include a "Delphin VDP" fixture by System 3R USA, Inc. of Elk Grove Village, Ill. Other ways in which a workpiece (40) may be mounted and/or secured for processes of the present example will be apparent to those of ordinary skill in the art in view of the teachings herein.

It will be appreciated that a variety of structural and operational parameters may be varied for the processes described herein. Such variables include, but are not limited to, those shown in the following table:

TABLE 1

| Symbol | Description |
| --- | --- |
| Ae | The radial depth at which each blade member (22) removes material from workpiece (40); may be expressed in units of mm. May also be expressed as "Radial DoC" (see below) or Ae (rad), also in units of mm. See FIG. 5 for illustration showing distinction between Ae and "Ae (true)," which is described below. |
| Ae (true) | The effective radial thickness of the "bite" into workpiece (40) by each blade member (22), or the distance, along the radial dimension of bore (50), between an end corner of the chip and the center of the convex side of the chip taken out of workpiece (40) by each blade member (22); may be expressed in units of mm. This is the effective radial distance to which blade member (22) is engaged with workpiece (40) during each cut by blade member (22). See FIG. 4 for exemplary calculation of Ae (true). See FIG. 5 for illustration showing distinction between Ae and Ae (true). |
| Ap (insert) | Maximum effective axial cutting length of blade member (22) edge. |
| Ap (part) | Axial length of cylinder bore (50). |
| Apr | Axial feed increment or pitch; also referred to as helical feed per helical/orbital revolution of tool (20) about bore axis (54); or helix height or displacement in z-direction (300) per helical/orbital revolution of tool (20) about bore axis (54) as tool (20) is advanced into bore (50). For instance, Axial DoC = Apr in some variations. |
| Dc | Diameter of tool (20), or distance between outermost points of blade members (22). |
| Dm | Machined diameter of bore (50); or diameter of bore (50) in workpiece (40) after a helical interpolation process (e.g., after semi/finish boring by helical interpolation). |
| DoC | Dept of cut. May be expressed as radial DoC or axial DoC; each of which may be expressed in units of mm. Radial DoC would be radial engagement; or depth of cut in radial direction; or the radial depth at which a blade member (22) removes material from workpiece (40). Axial DoC would be axial engagement; or depth of cut in axial direction; or axial length at which a blade member (22) removes material from workpiece (40). For instance, Axial DoC = Apr in some variations. Axial DoC may also be expressed as "Ap." Radial DoC may also be expressed as "Ae." |
| Dw | Diameter of bore (50) in workpiece (40) prior to initiation of each phase of a boring process. For instance, before a process of rough boring, Dw would be the diameter of bore (50) as cast; and Dm would be the diameter of bore (50) after the rough boring process. Thereafter, the diameter of rough bore (50) would become Dw; and Dm would be the diameter of bore (50) after a semi-finish process. Similarly, Dw would then become the diameter of semi-finished bore (50); and Dm would be the diameter of bore (50) after a finish process. |
| Fz | Feed per blade member (22); or total distance traveled by each blade member (22) in each rotation of the tool (20) about the tool axis (24); may be expressed in units of mm. To the extent that tool (20) is advanced helically into workpiece (40), Fz would be the helical distance traveled by each blade member (22) in each rotation of the tool (20) about the tool axis (24). The helix angle of such helical interpolation may permit the axial component of such helical distance to be ignored as negligible (e.g., only the circumferential component of such helical distance may be considered). For instance, if tool (20) has one blade member (22) and the feed of tool (20), Vf, is 0.002 inches |

TABLE 1-continued

Figure 5:
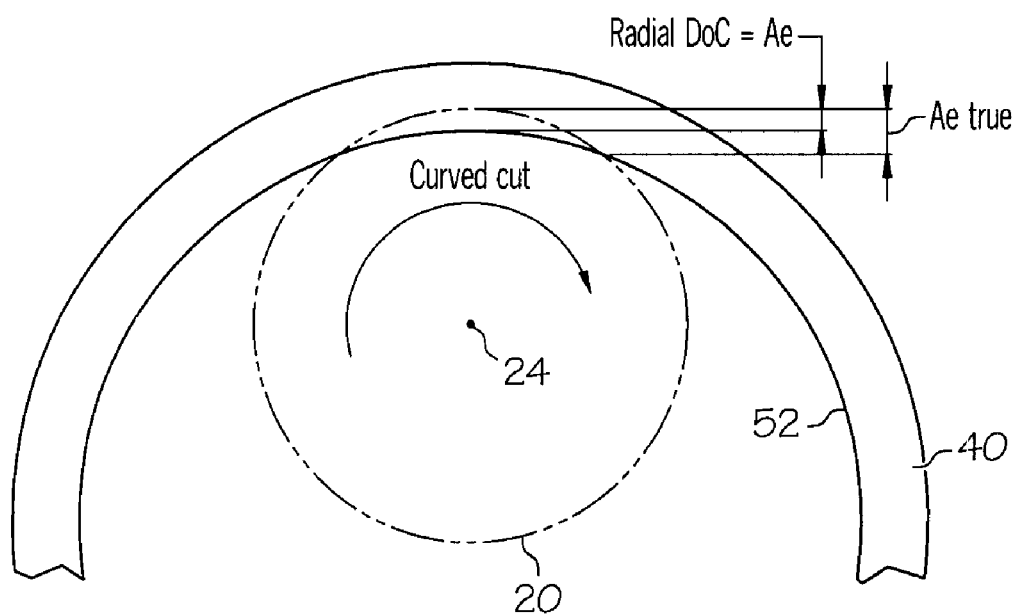
FIG. 5 depicts a partial view of a tool removing material from a bore in an exemplary fashion.

| Symbol | Description |
|---|---|
| | per revolution about tool axis (24), then blade member (22) may travel 0.002 inches per revolution about tool axis (24). If tool (20) has two blade members (22), and the Vf is 0.004 inches per revolution about tool axis (24), then Fz may still be about 0.002 inches. |
| hex | The thickness of the thickest part of the chip taken out of workpiece (40) by each blade member (22), or the greatest distance between radially opposing points on opposite sides of the chip taken out of workpiece (40) by each blade member (22); may be expressed in units of mm. In the example of FIG. 5, the hex value happens to be equal to the Ae value at the center of tool (20), at the point of tangency. However, it should be understood that the hex value may be greater than or less than the Ae value. For instance, to the extent that the first blade member (22) to remove material from workpiece (40) encounters a smooth, uninterrupted surface, the second and third blade members (22) may engage workpiece (40) within a portion of a scallop created by the first blade member (22). It should also be understood that Ae(true) may be used to obtain a particular desired hex value. |
| I | The "crown" height of blade member (22). E.g., if the edge of blade member (22) is not straight but curved, this is the height of the arc segment. |
| kc | Specific cutting force; may be expressed in units of $N/mm^2$. |
| LoE | Length of engagement; or circumferential/arcuate distance that a blade member (22) engages the bore surface (52) (e.g., time in cut). If blade member (22) simply moves in a circular path, then there would be no axial component to LoE. However, if blade member (22) moves in a helical path, LoE would have an axial component in addition to having a circumferential component. Relationships between LoE, Dw, Dm, and Zn may be set to allow only one blade member (22) in cut at a given time. |
| n or rpm | Revolutions per minute at which tool (20) rotates about tool axis (24). $n = Vc * 1000/\pi/Dc(metric)$ |
| Pc | Net power used per minute; may be expressed in units of kW/min. |
| Q or MRR | Volume of material removed from workpiece (40) by tool (20) per minute; may be expressed in units of $mm^3/min$. |
| re | Corner radii of blade members (22), to the extent that corners of blade members (22) are radiused. |
| Ra, Rq, Rz | Bore surface (54) finish criteria, per industry surface evaluation standards (e.g., ANSI, ISO, JIS, DIN, etc.). |
| Rc | Radius of tool (20); or Dc/2. |
| Rm | Machined radius of bore (50); or radius of bore (50) in workpiece (40) after a helical interpolation process (e.g., after semi/finish boring by helical interpolation); or Dm/2. |
| Rw | Radius of bore (50) workpiece (40) after a rough boring process; or Dw/2. |
| Vc | Velocity of blade member (22); may be expressed in units of m/min. |
| $Vf_1$ | Feed rate; or linear velocity at which center of tool (20) is advanced in the z-direction (300); may be expressed in units of mm/min. |
| $Vf_2$ | Peripheral Vf, or linear velocity of periphery of tool (20) (e.g., at outer diameter of blade member (22)), which is corrected for $Vf_1$ feed at center of tool (20). The path of the outer edge of tool (20) may be longer than the center line path, so it may be slowed down or corrected for the internal geometry so that the feed per blade member (22), Fz, is not too high. |
| Vp | The rate at which material is removed from workpiece (40) by blade members (22); may be expressed in units of $N/mm^2/kW$. |
| Wt | Waviness of bore surface (52); or a surface parameter to evaluate the profile over the crests of the bore surface (52) (as opposed to Ra, Rq, or Rz, which evaluate the bore surface (52) itself). |
| Zn | Number of "effective" or working blade members (22) on tool (20); or number of blade members (22) that actually do work on workpiece (40) (e.g., as opposed to blade members (22) that merely follow through for "clean up"). Blade members (22) that actually do work may be distinguished from blade members (22) that merely "clean up" based on the radial position of blade members (22), in some versions. May be based on diameter of tool (20), helix angle, and/or Ap (part), and/or other factors. |

Of course, the foregoing variables are merely exemplary. Other variables are discussed below, while even more variables will be apparent to those of ordinary skill in the art in view of the teachings herein.

It will also be appreciated that changing the variables may have negligible to significant effects on bore surface (52) (e.g., smoothness, roundness, precision, etc.), blade members (22) (e.g., wear, temperature, etc.), tool (20), base (30), and/or other components. Accordingly, some selections or ranges of values for the parameters/variables, or functions of parameters/variables, may be desirable for the effects produced. For instance, it may be desirable to maximize the "hex" or the size of the chip removed from workpiece (40) by each blade member (22). Of course, the structural and operational parameters may be varied in any other suitable way.

FIGS. 4, 6-7, 15, and 23-24 depict exemplary general formulae for establishing certain parameters associated with processes described herein and bores (50) associated with such processes. For instance, FIG. 4 shows how the "Ae (true)," which is described above, may be determined. In FIG. 4, "Dw," which represents the diameter of bore (50) in workpiece (40) after a rough boring process, is 100.000 mm. "Dm," which represents the diameter of bore (50) to be created in workpiece (40) after a helical interpolation process, is 102.000 mm. "Dc," which represents the diameter of tool (20), is 84.000 mm. According to the formulae shown in FIG.

4, this yields an Ae (true) value of 5.611 mm. Of course, the formula for calculating an "Ae (true)" value as shown in FIG. 4 is merely exemplary.

Figure 6:
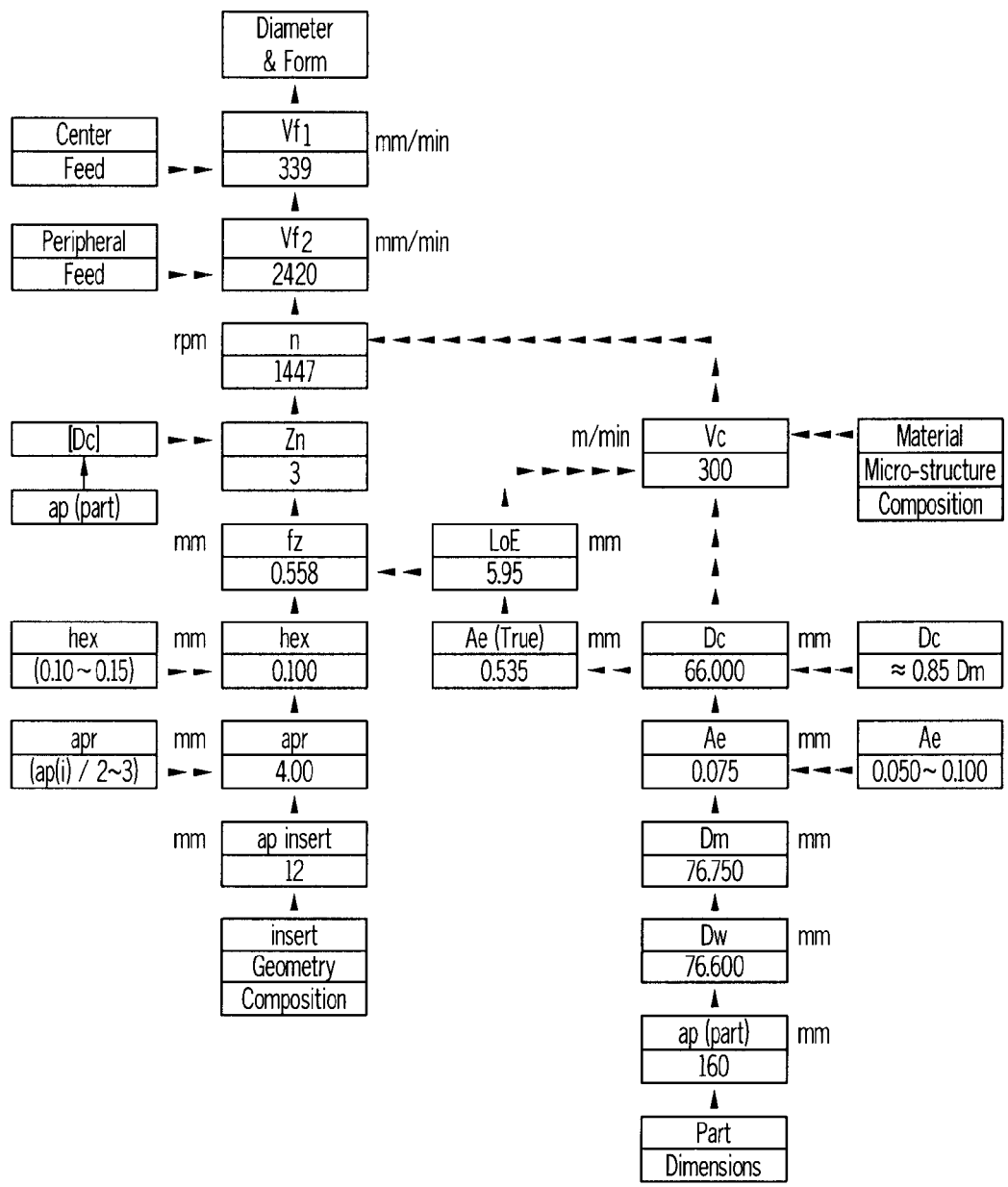
FIG. 6 depicts an exemplary general formula for establishing the diameter and form of a bore, with units of length expressed in millimeters.
Figure 7:
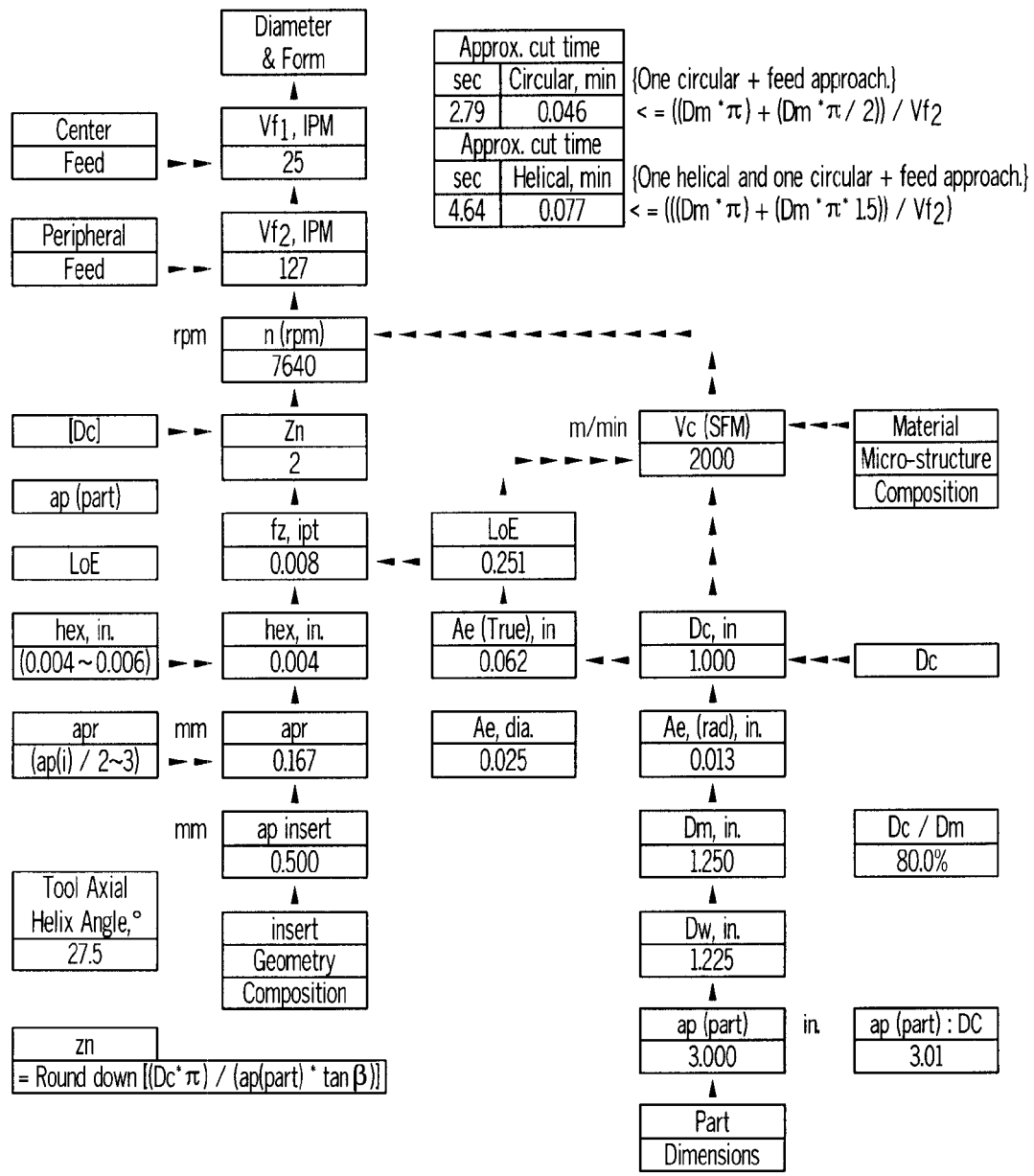
FIG. 7 depicts another exemplary general formula for establishing the diameter and form of a bore, with units of length expressed in inches.
Figure 15:
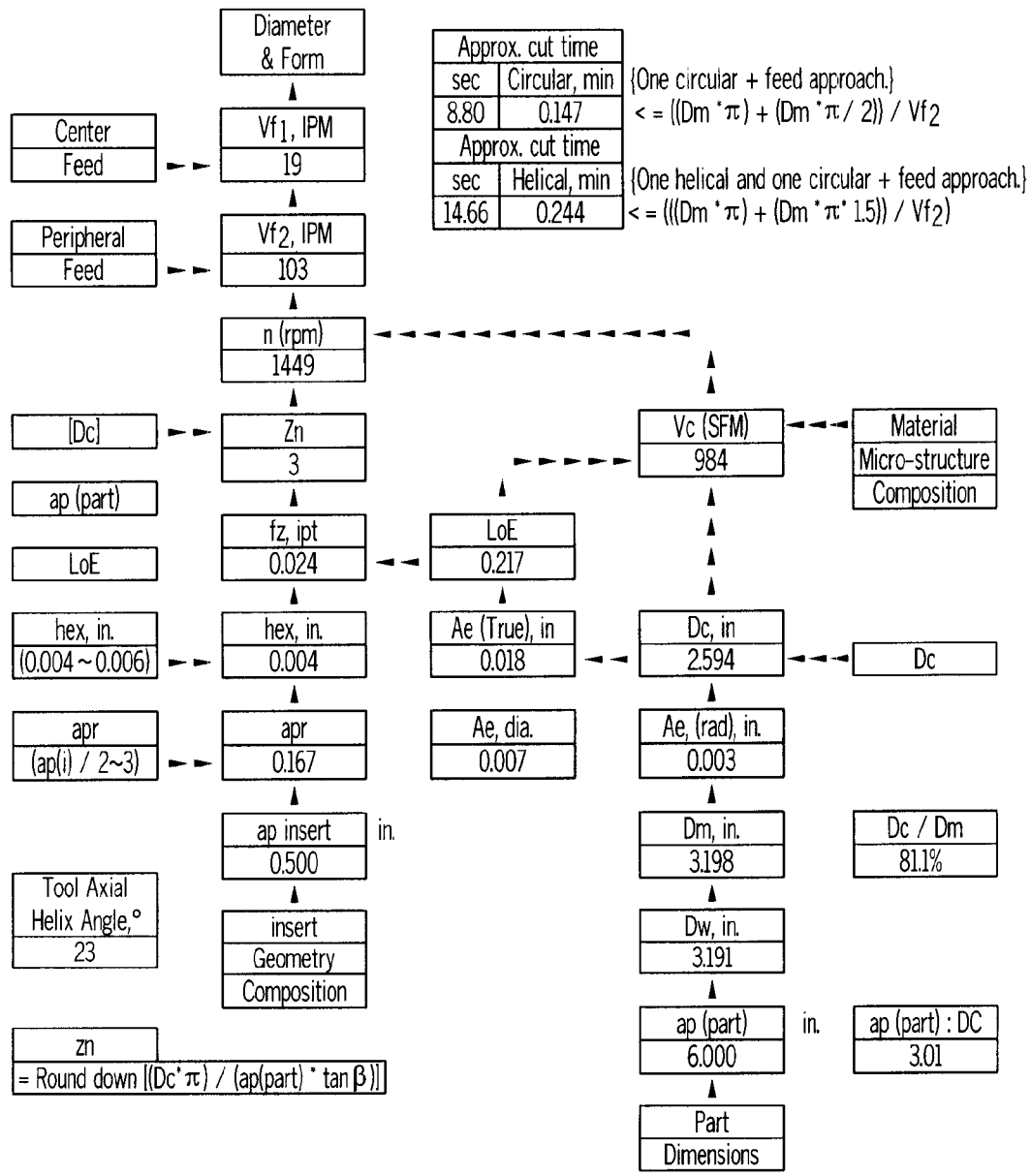
FIG. 15 depicts another exemplary general formula for establishing the diameter and form of a bore, with units of length expressed in inches.

As shown in FIGS. 6-7 and 15, the "Ae (true)" value may have a significant impact on other variables or operational parameters in accordance with processes described herein. In other words, the "Ae (true)" value may influence decisions on how to control other variables or operational parameters when carrying out processes described herein (e.g., helical interpolation with a tool (20) to produce or work on bore (50)).

In FIGS. 6-7, 15, and 23-24, the arrows show how certain factors and parameters may be linked together, interact with each other, and/or influence one another. For instance, as shown in FIG. 6, the "LoE" may have a significant impact on the "Vc." Similarly, as shown in FIG. 6, the "Dc" may have a significant impact on "Zn."

In addition, the spatial arrangement of the factors and parameters shown in FIGS. 6-7, 15, and 23-24 may represent the order in which values for certain factors and parameters should be chosen, considered, or determined. For instance, in some versions of the process of the present example, FIGS. 6-7 and 15 show the basic formulae for determining the proper cutting settings for internal cylinder milling (e.g., producing or working on bore (50) with tool (20)), based on the "Ae" and "Ae (true)" required for cuts by cutting members (22). Furthermore, in some versions of the process of the present example, the "Ae" or "Ae (true)" factor may need to be adjusted to allow only one cutting member (22) to be engaged with workpiece (40) at any given time during a helical interpolation process. Of course, "Ae" or "Ae (true)" may be otherwise considered or factored into a process. As also shown in FIGS. 6-7 and 15, the geometry of a blade member (22) drives the decision on what to set the "Ap (insert)" at. These two factors will then dictate the "Apr," which will in turn dictate the "hex." Based on the "hex," the "Fz" value should be chosen. After the "Fz" value is chosen (considering both the "hex" and the "LoE"), the "Zn" should be set. The same type of decision making processes may be employed using the arrangements in the remainder of FIGS. 6-7, 15, and 23-24—starting from the bottom of the "tree," working the way up to the top of the "tree."

As another merely illustrative example, and with reference to FIG. 6, an operator may first start with a selection of Ap (part), Dw, and Dm. For instance, such parameters may be predetermined based upon manufacturing specifications provided for a particular workpiece (40). With these parameters predetermined, a value for Ae (radial) may be determined. In addition, the value for Dc, which may also be predetermined, may further determine the Ae(true) and LoE. The hex may then be selected, which may then determine the Fz. The product from multiplying Fz with Zn may provide the advance of tool (20) per revolution. The product from multiplying Fz with Zn with n (rpm) may provide the Vf per minute. Values for $Vf_1$ and $Vf_2$ may then be calculated, as tool (20) may be programmed by its center while hex is "produced" at its periphery. Of course, in other versions, factors and parameters may be considered and determined in any other suitable order, and based on any other suitable considerations.

It should also be understood that selections of certain operating parameters may be influenced, at least in part, by other operating parameters that have been chosen. In other words, and as described elsewhere herein, some operating parameters may have ideal relationships with each other. By way of example only, in some settings it may be desirable for the Dc/Dm relationship to be between about 75% and about 85%, inclusive. That is, it may be desirable in some settings for the diameter of tool (20) to be between about 75% and about 85% of the machined diameter of bore (50). To the extent that the machined diameter of bore (50) is inflexible (e.g., due to manufacturing requirements, etc.), a tool (20) may be selected or constructed such that the diameter of tool (20) fits within a 75% to 85% ratio with the machined diameter of bore (50). Alternatively, any other suitable Dc/Dm relationship may be used. As another merely exemplary parameter ratio that may be desirable in some settings, the ratio of Ap (part) to Dc may be approximately 3:1 or less. In other words, it may be desirable in some settings for the diameter of tool (20) to be at least approximately ⅓ of the axial length of cylinder bore (50). Other suitable parameter ratios and other types of parameter relationships will be apparent to those of ordinary skill in the art in view of the teachings herein.

Example 1

FIG. 6 depicts an exemplary formula that may be used to guide decisions about how to carry out helical interpolation boring processes described herein. As noted above, the arrangement of parameters and arrows between parameters in FIG. 6 show how certain factors and parameters may be linked together, interact with each other, and/or influence one another. While values shown in FIG. 6 are expressed in metric units, conversion of such units to English units will be apparent to those of ordinary skill in the art.

The below Table 2 shows various parameters and results that may be used and achieved in accordance with the formula shown in FIG. 6. Table 2 includes merely exemplary values and ranges of values, in which the upper and lower boundaries of the ranges are considered as being within the ranges.

TABLE 2

| Parameter | Exemplary Values and Ranges (approximate) |
|---|---|
| $Vf_1$ | 339 mm/min |
| | or between about 300 mm/min and about 400 mm/min |
| | or between about 325 mm/min and about 375 mm/min |
| | or between about 2 in/min and about 45 in/min |
| | or between about 12 in/min and about 25 in/min |
| | or between about 7 in/min and about 29 in/min |
| $Vf_2$ | 2420 mm/min |
| | or between about 2000 mm/min and about 3000 mm/min |
| | or between about 2250 mm/min and about 2275 mm/min |
| | or between about 20 in/min and about 170 in/min |
| | or between about 62 in/min and about 156 in/min |
| | or between about 35 in/min and about 154 in/min |
| n | 1447 rpm |
| | or between about 1000 rpm and about 9000 rpm |
| | or between about 1000 rpm and about 2000 rpm |
| | or between about 1250 rpm and about 1750 rpm |
| | or between about 1400 rpm and about 1500 rpm |
| | or between about 5000 rpm and about 10,000 rpm |
| | or between about 7500 rpm and about 7700 rpm |
| Zn | 3 |
| | or between about 1 and about 20 |
| | or between about 2 and about 10 |
| | or between about 1 and about 3 |
| | or between about 4 and about 5 |
| Fz | 0.558 mm |
| | or between about 0.300 mm and about 0.800 mm |
| | or between about 0.450 mm and about 0.650 mm |
| | or between about 0.001 inches and about 0.100 inches |
| | or between about 0.004 inches and about 0.010 inches |
| | or between about 0.008 inches and about 0.035 inches |
| Hex | 0.100 mm |
| | or between about 0.100 mm and about 0.150 mm |
| | or between about 0.050 mm and about 0.250 mm |
| | or between about 0.001 inches and about 0.010 inches |
| | or between about 0.004 inches and about 0.006 inches |

TABLE 2-continued

| Parameter | Exemplary Values and Ranges (approximate) |
|---|---|
| Apr | 4.00 mm |
| | or between about 1.00 mm and about 6.00 mm |
| | or between about 2.00 mm and about 5.00 mm |
| | or between about 0.050 inches and about 0.500 inches |
| | or between about 0.167 inches and about 0.250 inches |
| Ap (insert) | 12 mm |
| | or between about 1 mm and about 20 mm |
| | or between about 7 mm and about 15 mm |
| | or between about 0.300 inches and about 0.700 inches |
| | or between about 0.450 inches and about 0.550 inches |
| Vc | 300 m/min |
| | or between about 100 in/min and about 400 m/min |
| | or between about 200 m/min and about 350 m/min |
| | or between about 500 ft/min and about 3000 ft/min |
| | or between about 1550 ft/min and about 2500 ft/min |
| | or between about 950 ft/min and about 1000 ft/min |
| LoE | 5.95 mm |
| | or between about 1.00 mm and about 8.00 mm |
| | or between about 4.00 mm and about 6.50 mm |
| | or between about 0.100 inches and about 1.000 inches |
| | or between about 0.313 inches and about 0.702 inches |
| | or between about 0.217 inches and about 0.631 inches |
| Ae | 0.075 mm |
| | or between about 0.050 mm and about 0.100 mm |
| | or between about 0.020 mm and about 0.250 mm |
| | or between about 0.001 inches and about 0.200 inches |
| | or between about 0.013 inches and about 0.125 inches |
| | or between about 0.003 inches and about 0.034 inches |
| | or between about 0.025 inches and about 0.500 inches |
| Ae (true) | 0.535 mm |
| | or between about 0.150 mm and about 0.900 mm |
| | or between about 0.300 and about 0.700 mm |
| | or between about 0.005 inches and about 0.750 inches |
| | or between about 0.095 inches and about 0.417 inches |
| | or between about 0.018 inches and about 0.166 inches |
| Dc | 66.000 mm |
| | or between about 20.000 mm and about 80.000 mm |
| | or between about 45.000 mm and about 70.000 mm |
| | or between about 0.050 inches and about 5.000 inches |
| | or between about 0.750 inches and about 1.250 inches |
| | or between about 2.500 inches and about 2.600 inches |
| Ap (part) | 160 mm |
| | or between about 50 mm and about 250 mm |
| | or between about 100 mm and about 200 mm |
| | or between about 1.500 inches and about 10.000 inches |
| | or between about 2.750 inches and about 3.250 inches |
| | or between about 5.500 inches and about 6.500 inches |
| Dw | 76.600 mm |
| | or between about 20.000 mm and about 150.000 mm |
| | or between about 45.000 mm and about 100.000 mm |
| | or between about 0.500 inches and about 10.000 inches |
| | or between about 1.000 inches and about 1.125 inches |
| | or between about 3.000 inches and about 3.250 inches |
| Dm | 76.750 mm |
| | or between about 20.000 mm and about 150.000 mm |
| | or between about 45.000 mm and about 100.000 mm |
| | or between about 0.750 inches and about 10.000 inches |
| | or between about 1.150 inches and about 1.375 inches |
| | or between about 3.198 inches and about 3.260 inches |

The values and ranges in the above table are merely exemplary, and any other suitable values or ranges may be used. Furthermore, each and every number provided in the above table is merely approximate, not necessarily absolute. In addition, the inventors contemplate that the boundaries of the ranges disclosed above are included within the ranges.

In some variations, some of the parameters shown in FIG. 6, and the corresponding values/ranges shown in Table 2, may be regarded as "inputs" into the formula shown in FIG. 6; while other parameters may be regarded as "outputs." In other words, some factors or parameters may be predetermined ("inputs"), while other factors or parameters ("outputs") may be calculated or otherwise determined or achieved based at least in part upon the predetermined factors or parameters. In particular, the following parameters may be regarded as "inputs": Dc, Ap (part), hex, Zn, Ap (insert), Vc, Dc, Dm, and Dw. The following parameters may be regarded as "outputs": $Vf_1$, $Vf_2$, n, Fz, Apr, LoE, Ae (true), and Ae. Of course, these arrangements are merely exemplary, and any factors or parameters may be regarded as "inputs" or "outputs" as desired. For instance, if certain "outputs" are desired, the formulae may be rearranged to solve for the associated "inputs" that are needed to obtain the desired "outputs."

Example 2

FIG. 7 depicts another exemplary formula that may be used to guide decisions about how to carry out processes described herein. As noted above, the arrangement of parameters and arrows between parameters in FIG. 7 show how certain factors and parameters may be linked together, interact with each other, and/or influence one another.

In the present example, the value for $Vf_1$ is calculated using Equation I, as follows:

$$Vf_1 = Vf_2 * ((Dm - Dc)/Dm) \qquad (I)$$

In the present example, the value for $Vf_2$ is calculated using Equation II, as follows:

$$Vf_2 = n * Zn * Fz \qquad (II)$$

In the present example, the value for n is calculated using Equation III, as follows:

$$n = Vc * 3.82 / Dc \qquad (III)$$

In the present example, the value for Zn is calculated using Equation IV, as follows:

$$Zn = ((\pi * Dc)/(\tan(\text{helix angle} * (\pi/180))) * Ap \qquad (IV)$$

In Equation IV, the "Ap" represents Ap (part), or the axial length of cylinder bore (50). To the extent that Equation IV yields a non-whole number, the result is rounded down to the nearest whole number in the present example. If Equation IV yields a number that is less than 1, then the result is rounded down to 0 in the present example.

In the present example, the value for Fz is calculated using Equation V, as follows:

$$Fz = Dc * \text{hex} / \sqrt{(Dc^2 - (Dc - 2*Ae)^2)} \qquad (V)$$

In the present example, the value for Apr is calculated using Equation VI, as follows:

$$Apr = Dm/3 \qquad (VI)$$

In the present example, the value for LoE is calculated using Equation VII, as follows:

$$LoE = Dc/2 * \sin^{-1}\left((2*\sqrt{(((Dm - 2*((Dm - Dw)/2))/2)^2 - ((Dc^2/4 - (Dm - 2*((Dm - Dw)/2))^2/4 - ((Dm - Dc)/2)^2)/(2*((Dm - Dc)/2)))^2)/Dc}\right) \qquad (VII)$$

In the present example, the value for Ae (true) is calculated using Equation VIII, as follows:

$$Ae(\text{true}) = Dm/2 - Dw * (((Dw/2)^2 + ((Dm - Dc)/2)^2 - (Dc/2)^2))/(Dw*(Dm - Dc)) \qquad (VIII)$$

In the present example, the value for Ae is calculated using Equation IX, as follows:

$$Ae=(Dm-Dw)/2 \qquad (IX)$$

It may be desirable to calculate the time it takes for tool (10) to travel about the path of a single orbit, without any motion in the z-direction. Such duration may be stated as "min (circular)," and may be expressed in terms of minutes. In the present example, the value for min (circular) is calculated using Equation X, as follows:

$$min(circular)=((\pi*Dm+(\pi*Dm/2))/Vf_2) \qquad (X)$$

It may also be desirable to calculate the time it takes for tool (10) to travel about the path of a single orbit, including motion in the z-direction (e.g., helical path). Such duration may be stated as "min (helical)," and may be expressed in terms of minutes. In the present example, the value for min (helical) is calculated using Equation XI, as follows:

$$min(helical)=(((\pi*Dm)+(\pi*Dm*1.5))/Vf_2) \qquad (XI)$$

Unless otherwise noted above, the variables represented in Equations I through XI may be directly correlated with the symbols described in Table 1 above. It should also be understood that Equations I through XI may be used to obtain the output values shown in Tables 3-1 through 3-3, Table 4, Table 5, and FIGS. 7-14. Those Tables and FIGS. Will be described in greater detail below. Equations I through XI may thus be used to guide a human or machine operator when implementing the helical interpolation processes described herein.

The below Tables 3-1 through 3-3 show various parameters and results that may be used and achieved, using a hex of 0.004 inches or a hex of 0.006 inches, in accordance with the formulae shown in FIG. 7 and described above. The data in Tables 3-1 through 3-3 is related in the sense that data associated with an exemplary run shown in row 1 of Table 3-1 continues in row 1 of Table 3-2, and then in row 1 of Table 3-3. Likewise, data associated with an exemplary run shown in row 2 of Table 3-1 continues in row 2 of Table 3-2, and then in row 2 of Table 3-3, and so on. Tables 3-1 through 3-3 may thus be viewed as fitting within a single table that is merely being broken into three sub-tables herein for space considerations. In the examples shown in Tables 3-1 through 3-3, the axial helix angle of tool (20) is approximately 27.5°. Of course, any other suitable helix angle may be used. In addition, the Ap (part) is approximately 3.000 inches, while the Ap (insert) is approximately 0.500 inches. The Apr is between approximately 0.250 inches per orbital revolution of tool (20) and approximately 0.167 inches per orbital revolution of tool (20). The Ae is changed in 0.025 inch increments each run. Again, these values are mere examples, and any others may be used. While values shown in FIG. 7 and Tables 3-1 through 3-3 are expressed in English units, conversion of such units to metric units will be apparent to those of ordinary skill in the art.

TABLE 3-1

| # | Dc, in | Dc/Dm | Zn | MAX Zn | Max Helix Angle, ° | Vc (SFM) | n (rpm) | Dw, in. | Dm, in. | hex, in. |
|---|---|---|---|---|---|---|---|---|---|---|
| 1 | 1.000 | 87.0% | 2 | 10 | 6.0 | 2000 | 7640 | 1.125 | 1.150 | 0.004 |
| 2 | 1.000 | 85.1% | 2 | 7 | 7.9 | 2000 | 7640 | 1.125 | 1.175 | 0.004 |
| 3 | 1.000 | 83.3% | 2 | 6 | 9.2 | 2000 | 7640 | 1.125 | 1.200 | 0.004 |
| 4 | 1.000 | 81.6% | 2 | 5 | 10.1 | 2000 | 7640 | 1.125 | 1.225 | 0.004 |
| 5 | 1.000 | 80.0% | 2 | 5 | 10.9 | 2000 | 7640 | 1.125 | 1.250 | 0.004 |
| 6 | 1.000 | 78.4% | 2 | 5 | 11.5 | 2000 | 7640 | 1.125 | 1.275 | 0.004 |
| 7 | 1.000 | 76.9% | 2 | 4 | 12.0 | 2000 | 7640 | 1.125 | 1.300 | 0.004 |
| 8 | 1.000 | 75.5% | 2 | 4 | 12.4 | 2000 | 7640 | 1.125 | 1.325 | 0.004 |
| 9 | 1.000 | 74.1% | 2 | 4 | 12.8 | 2000 | 7640 | 1.125 | 1.350 | 0.004 |
| 10 | 1.000 | 72.7% | 2 | 4 | 13.2 | 2000 | 7640 | 1.125 | 1.375 | 0.004 |
| 11 | 1.000 | 87.0% | 2 | 10 | 6.0 | 2000 | 7640 | 1.125 | 1.150 | 0.006 |
| 12 | 1.000 | 85.1% | 2 | 7 | 7.9 | 2000 | 7640 | 1.125 | 1.175 | 0.006 |
| 13 | 1.000 | 83.3% | 2 | 6 | 9.2 | 2000 | 7640 | 1.125 | 1.200 | 0.006 |
| 14 | 1.000 | 81.6% | 2 | 5 | 10.1 | 2000 | 7640 | 1.125 | 1.225 | 0.006 |
| 15 | 1.000 | 80.0% | 2 | 5 | 10.9 | 2000 | 7640 | 1.125 | 1.250 | 0.006 |
| 16 | 1.000 | 78.4% | 2 | 5 | 11.5 | 2000 | 7640 | 1.125 | 1.275 | 0.006 |
| 17 | 1.000 | 76.9% | 2 | 4 | 12.0 | 2000 | 7640 | 1.125 | 1.300 | 0.006 |
| 18 | 1.000 | 75.5% | 2 | 4 | 12.4 | 2000 | 7640 | 1.125 | 1.325 | 0.006 |
| 19 | 1.000 | 74.1% | 2 | 4 | 12.8 | 2000 | 7640 | 1.125 | 1.350 | 0.006 |
| 20 | 1.000 | 72.7% | 2 | 4 | 13.2 | 2000 | 7640 | 1.125 | 1.375 | 0.006 |

TABLE 3-2

| # | Ae, in. | Ae Δ % | Ae/Dc | Ae (true), in. | Ae (true) Δ % | LoE, in. | LoE Δ % | Fz, ipt | $Vf_2$, IPM | $Vf_1$, IPM |
|---|---|---|---|---|---|---|---|---|---|---|
| 1 | 0.013 | 100.0% | 0.013 | 0.095 | 100.0% | 0.313 | 100.0% | 0.007 | 104 | 14 |
| 2 | 0.025 | 50.0% | 0.025 | 0.164 | 42.3% | 0.417 | 25.0% | 0.005 | 82 | 12 |
| 3 | 0.038 | 33.3% | 0.038 | 0.218 | 24.6% | 0.486 | 14.1% | 0.005 | 74 | 12 |
| 4 | 0.050 | 25.0% | 0.050 | 0.261 | 16.5% | 0.536 | 9.4% | 0.005 | 70 | 13 |
| 5 | 0.063 | 20.0% | 0.063 | 0.297 | 12.0% | 0.576 | 6.9% | 0.004 | 67 | 13 |
| 6 | 0.075 | 16.7% | 0.075 | 0.327 | 9.3% | 0.609 | 5.4% | 0.004 | 65 | 14 |
| 7 | 0.088 | 14.3% | 0.088 | 0.354 | 7.5% | 0.637 | 4.4% | 0.004 | 64 | 15 |
| 8 | 0.100 | 12.5% | 0.100 | 0.377 | 6.2% | 0.661 | 3.7% | 0.004 | 63 | 15 |
| 9 | 0.113 | 11.1% | 0.113 | 0.398 | 5.2% | 0.682 | 3.1% | 0.004 | 62 | 16 |
| 10 | 0.125 | 10.0% | 0.125 | 0.417 | 4.5% | 0.702 | 2.7% | 0.004 | 62 | 17 |
| 11 | 0.013 | 100.0% | 0.013 | 0.095 | — | 0.313 | — | 0.010 | 156 | 20 |
| 12 | 0.025 | 50.0% | 0.025 | 0.164 | 42.3% | 0.417 | 25.0% | 0.008 | 124 | 18 |
| 13 | 0.038 | 33.3% | 0.038 | 0.218 | 24.6% | 0.486 | 14.1% | 0.007 | 111 | 19 |
| 14 | 0.050 | 25.0% | 0.050 | 0.261 | 16.5% | 0.536 | 9.4% | 0.007 | 104 | 19 |

TABLE 3-2-continued

| # | Ae, in. | Ae Δ % | Ae/Dc | Ae (true), in. | Ae (true) Δ % | LoE, in. | LoE Δ % | Fz, ipt | Vf$_2$, IPM | Vf$_1$, IPM |
|---|---------|--------|-------|----------------|---------------|----------|---------|---------|-------------|-------------|
| 15 | 0.063 | 20.0% | 0.063 | 0.297 | 12.0% | 0.576 | 6.9% | 0.007 | 100 | 20 |
| 16 | 0.075 | 16.7% | 0.075 | 0.327 | 9.3%  | 0.609 | 5.4% | 0.006 | 98  | 21 |
| 17 | 0.088 | 14.3% | 0.088 | 0.354 | 7.5%  | 0.637 | 4.4% | 0.006 | 96  | 22 |
| 18 | 0.100 | 12.5% | 0.100 | 0.377 | 6.2%  | 0.661 | 3.7% | 0.006 | 95  | 23 |
| 19 | 0.113 | 11.1% | 0.113 | 0.398 | 5.2%  | 0.682 | 3.1% | 0.006 | 94  | 24 |
| 20 | 0.125 | 10.0% | 0.125 | 0.417 | 4.5%  | 0.702 | 2.7% | 0.006 | 93  | 25 |

TABLE 3-3

| # | Vf$_1$ Δ % | sec | min (circular) | sec | Helical Apr1, min | Helical Apr2, min |
|---|------------|-----|----------------|-----|-------------------|-------------------|
| 1  | 100.0% | 3.12 | 0.052 | 16.33 | 0.272 | 0.272 |
| 2  | 9.7%   | 4.03 | 0.067 | 21.10 | 0.352 | 0.352 |
| 3  | -0.4%  | 4.58 | 0.076 | 24.01 | 0.400 | 0.400 |
| 4  | -3.6%  | 4.98 | 0.083 | 26.08 | 0.435 | 0.435 |
| 5  | -4.7%  | 5.28 | 0.088 | 27.68 | 0.461 | 0.461 |
| 6  | -5.0%  | 5.54 | 0.092 | 28.99 | 0.483 | 0.483 |
| 7  | -5.0%  | 5.75 | 0.096 | 30.12 | 0.502 | 0.502 |
| 8  | -4.9%  | 5.94 | 0.099 | 31.12 | 0.519 | 0.519 |
| 9  | -4.7%  | 6.11 | 0.102 | 32.02 | 0.534 | 0.534 |
| 10 | -4.4%  | 6.27 | 0.105 | 32.85 | 0.547 | 0.548 |
| 11 | —      | 2.08 | 0.035 | 10.88 | 0.181 | 0.181 |
| 12 | 9.7%   | 2.69 | 0.045 | 14.07 | 0.234 | 0.235 |
| 13 | -0.4%  | 3.06 | 0.051 | 16.01 | 0.267 | 0.267 |
| 14 | -3.6%  | 3.32 | 0.055 | 17.38 | 0.290 | 0.290 |
| 15 | -4.7%  | 3.52 | 0.059 | 18.45 | 0.308 | 0.308 |
| 16 | -5.0%  | 3.69 | 0.062 | 19.33 | 0.322 | 0.322 |
| 17 | -5.0%  | 3.83 | 0.064 | 20.08 | 0.335 | 0.335 |
| 18 | -4.9%  | 3.96 | 0.066 | 20.74 | 0.346 | 0.346 |
| 19 | -4.7%  | 4.08 | 0.068 | 21.35 | 0.356 | 0.356 |
| 20 | -4.4%  | 4.18 | 0.070 | 21.90 | 0.365 | 0.365 |

The values in Tables 3-1 through 3-3 are merely exemplary, and any other suitable values or ranges may be used. Furthermore, each and every number provided in Tables 3-1 through 3-3 is merely approximate, not necessarily absolute.

In some variations, some of the parameters shown in FIG. 7, and the corresponding values/ranges shown in Tables 3-1 through 3-3, may be regarded as "inputs" into the formula shown in FIG. 7; while others may be regarded as "outputs." In other words, some factors or parameters may be predetermined ("inputs"), while other factors or parameters ("outputs") may be calculated or otherwise determined or achieved based at least in part upon the predetermined factors or parameters. In particular, the following parameters may be regarded as "inputs": Dc, Ap (part), LoE, hex, Tool Axial Helix Angle, Ap (insert), Ae, Vc, Dc, and Dm. The following parameters may be regarded as "outputs": Vf$_1$, Vf$_2$, n, Zn, Fz, Apr, Ae (true), and Dc/Dm. Of course, these arrangements are merely exemplary, and any factors or parameters may be regarded as "inputs" or "outputs" as desired.

Figure 8:
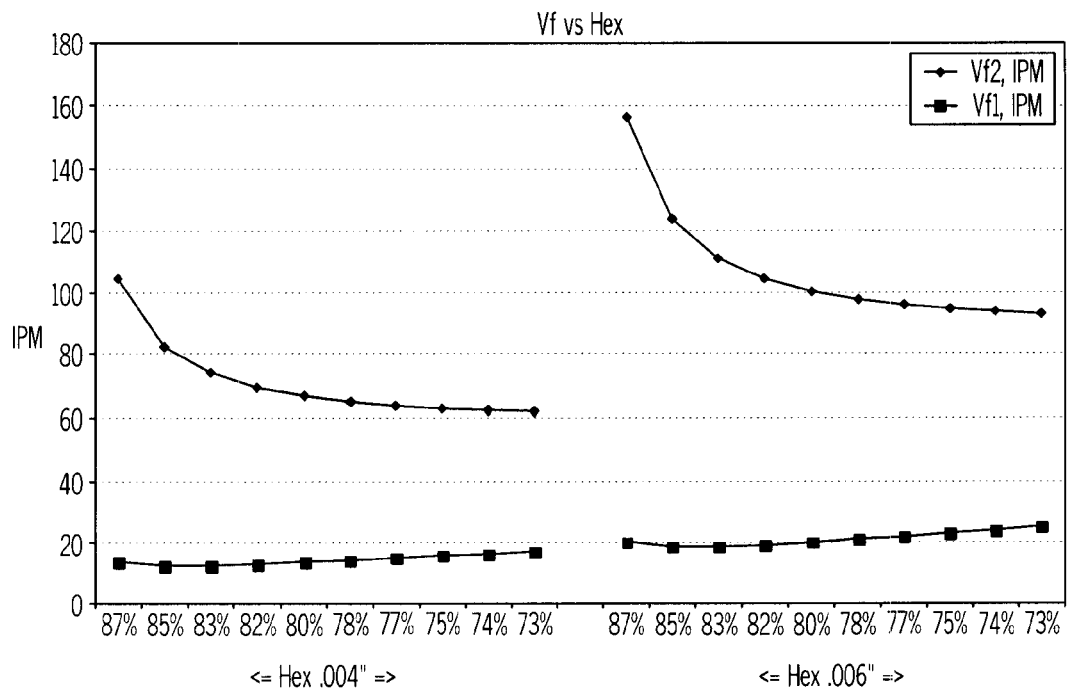
FIG. 8 depicts a plot of "Vf" versus "hex," with values obtained using the formula of FIG. 7 and data from Tables 3-1 through 3-3.

FIG. 8 depicts a plot of "Vf" versus "hex," with values obtained using the formula of FIG. 7 and data from Tables 3-1 through 3-3. The curves show that, below 75% Dc/Dm, the feed rate is substantially constant (flat). Above 75% Dc/Dm, the curve turns upward for improved feed rate and productivity. This may be regarded as the high speed machining zone. The curve is even steeper at the 0.006" hex. At about 85% Dc/DM, one may start to reach the physical limits of practical tool engagement in some settings.

Figure 9:
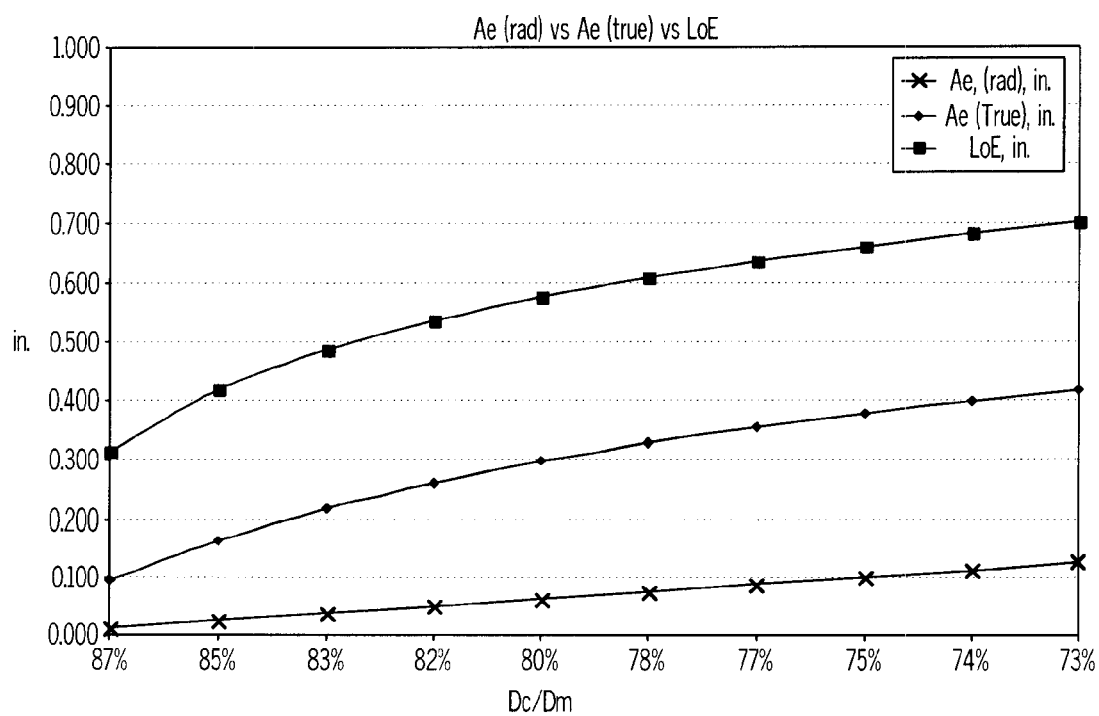
FIG. 9 depicts a plot of "Ae" versus "Ae (true)" versus "LoE," with values obtained using the formula of FIG. 7 and data from Tables 3-1 through 3-3.

FIG. 9 depicts a plot of "Ae" versus "Ae (true)" versus "LoE," with values obtained using the formula of FIG. 7 and data from Tables 3-1 through 3-3. As shown in FIG. 9, LoE gets shorter in the range of about 75% Dc/Dm to about 85% Dc/Dm. Shorter engagement time may translate into better tool life in some settings, so it may be desirable to favor fast engagement time.

Figure 10:
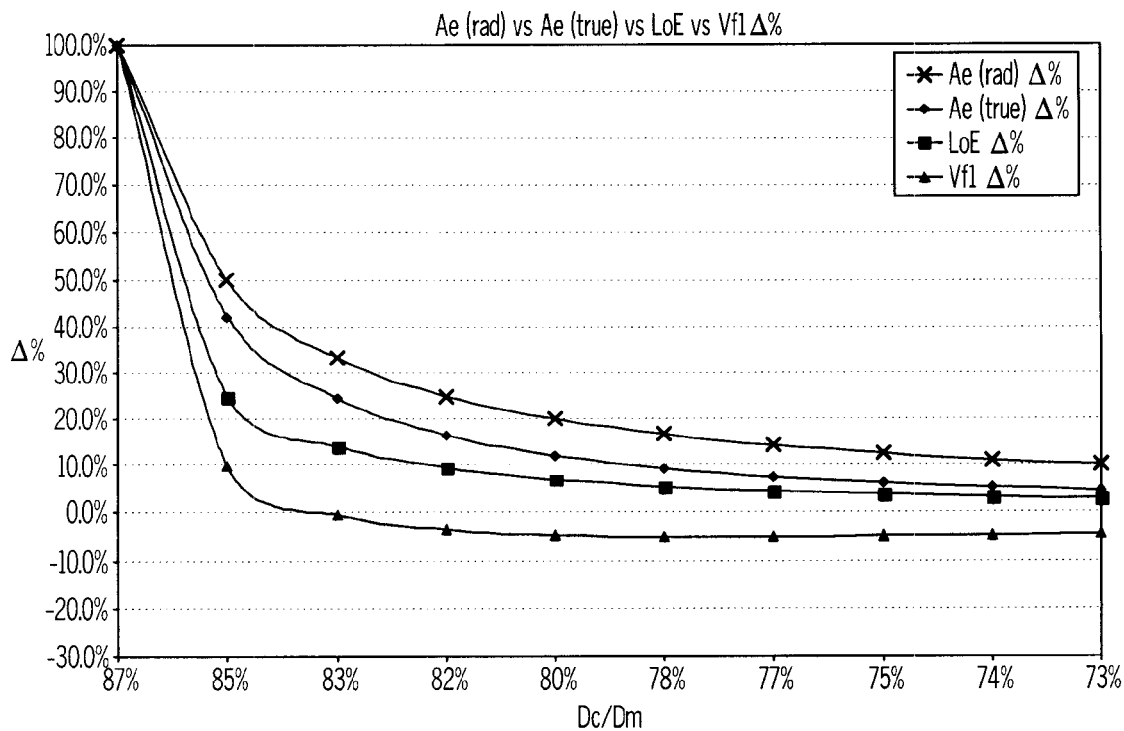
FIG. 10 depicts a plot of change in "Ae" versus "Ae (true)" versus "LoE" versus "Vf1," with values obtained using the formula of FIG. 7 and data from Tables 3-1 through 3-3.

FIG. 10 depicts a plot of change in "Ae" versus "Ae (true)" versus "LoE" versus "Vf1," with values obtained using the formula of FIG. 7 and data from Tables 3-1 through 3-3. As shown in FIG. 10, at about 85% Dc/DM, one may start to reach the physical limits of practical tool engagement in some settings.

Figure 11:
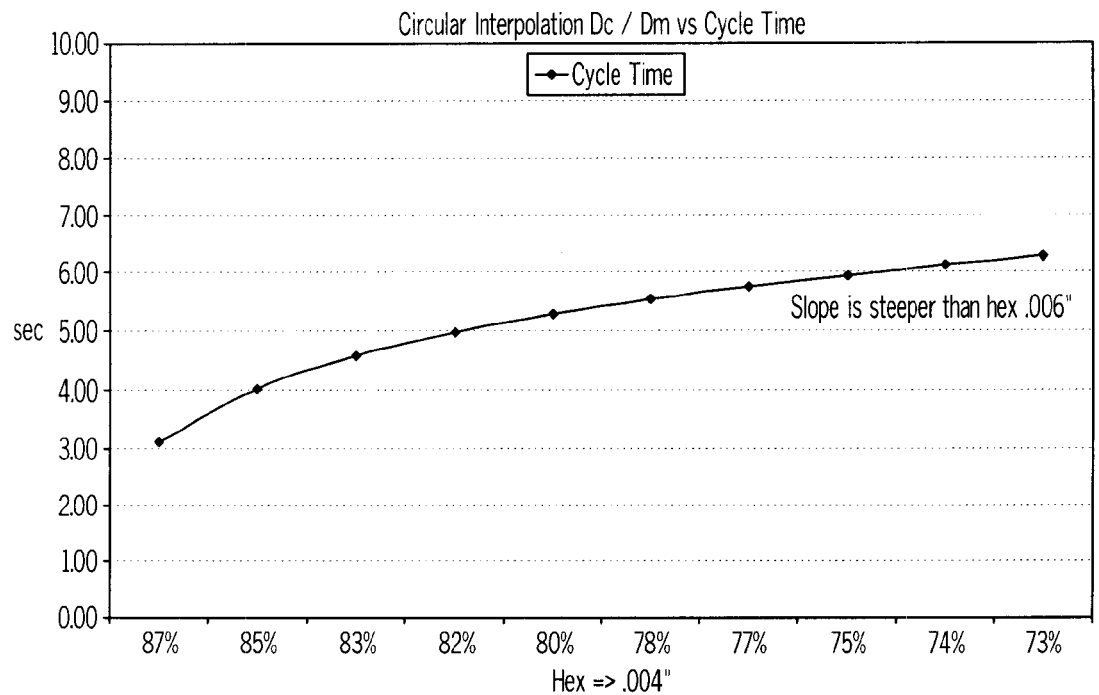
FIG. 11 depicts a plot of "Dc/Dm" ratios versus cycle time, with values obtained using the formula of FIG. 7 and data from Tables 3-1 through 3-3, with "hex" set at 0.004 inches.
Figure 12:
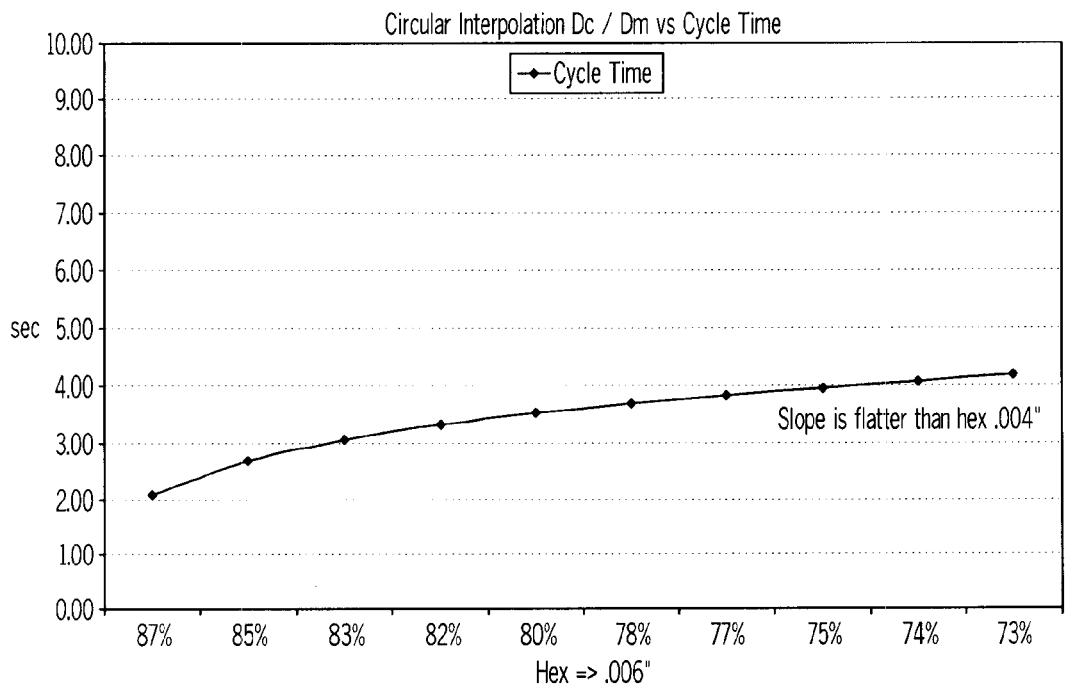
FIG. 12 depicts a plot of "Dc/Dm" ratios versus cycle time, with values obtained using the formula of FIG. 7 and data from Tables 3-1 through 3-3, with "hex" set at 0.006 inches.

FIG. 11 depicts a plot of "Dc/Dm" ratios versus cycle time, with values obtained using the formula of FIG. 7 and data from Tables 3-1 through 3-3, with "hex" set at 0.004 inches. FIG. 12 depicts a plot of "Dc/Dm" ratios versus cycle time, with values obtained using the formula of FIG. 7 and data from Tables 3-1 through 3-3, with "hex" set at 0.006 inches. As shown in FIGS. 11-12 collectively, even though the cycle time is relatively better for 0.006 inch "hex," the relative improvement in the cycle time range for 0.004 inch "hex" may be viewed as being relatively better because the slope of the curve is steeper.

The below Table 4 shows exemplary relationships between the axial cylinder length Ap (part), the axial helix angle, and the number of cutter teeth Zn. In this example, Dc is 1.000 inches, Dw is 1.125 inches, Dm is 1.175 inches, and Ae is 0.050 inches. Values from Table 4 are plotted in FIG. 13. Of course, a variety of alternative values may be used, and a variety of alternative relationships may be obtained.

TABLE 4

| Ap (part), in. | Helix Angle, ° | Zn |
|----------------|----------------|-----|
| 1.0 | 30.0 | 5.4 |
| 1.0 | 20.0 | 8.6 |
| 1.0 | 10.0 | 17.8 |
| 1.4 | 30.0 | 3.9 |
| 1.4 | 20.0 | 6.2 |
| 1.4 | 10.0 | 12.7 |
| 1.8 | 30.0 | 3 |
| 1.8 | 20.0 | 4.8 |
| 1.8 | 10.0 | 9.9 |
| 2.2 | 30.0 | 2.5 |
| 2.2 | 20.0 | 3.9 |
| 2.2 | 10.0 | 8.1 |
| 2.6 | 30.0 | 2.1 |
| 2.6 | 20.0 | 3.3 |
| 2.6 | 10.0 | 6.9 |
| 3.0 | 30.0 | 1.8 |
| 3.0 | 20.0 | 2.9 |
| 3.0 | 10.0 | 5.9 |

Figure 13:
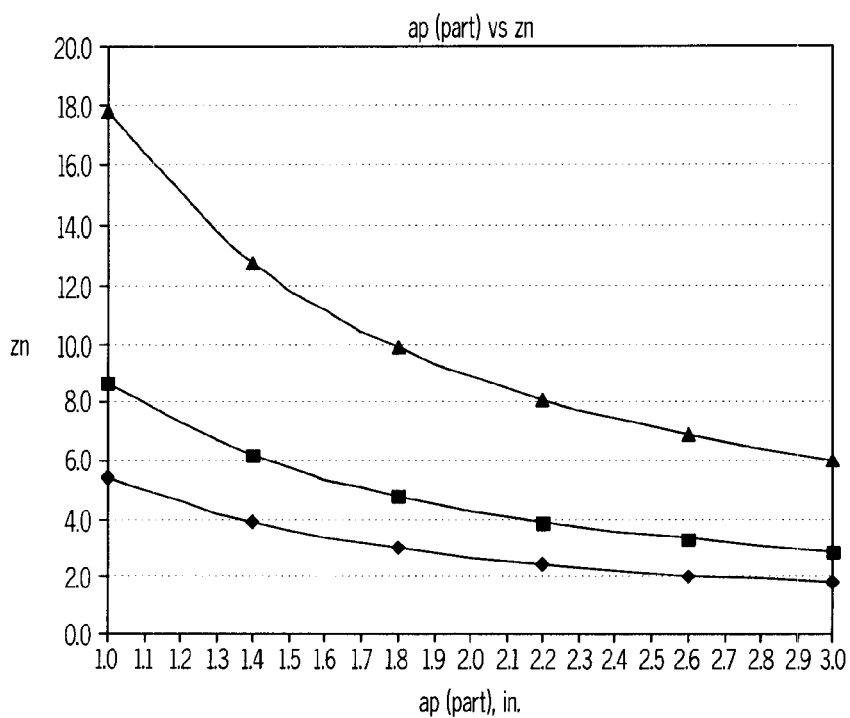
FIG. 13 depicts a plot of "Ap (part)" versus "Zn," with values obtained using the formula of FIG. 7 and data from Table 4.

FIG. 13 depicts a plot of "Ap (part)" versus "Zn," with values obtained using the formula of FIG. 7 and data from Table 4. As shown in Table 4, if Ap (part) is 1.8 inches, and the helix angle is 30.0°, then it may be most desirable to use three cutting members (22). If Ap (part) is 1.0 inches, and the helix angle is 20.0°, then it may be most desirable to use eight cutting members (22) (with the non-whole value of Zn being rounded down).

The below Table 5 shows exemplary relationships between the length of engagement LoE and the number of cutter teeth Zn. In this example, Dc is 1.000 inches, Dw is 1.125 inches, Ap (part) is 3.000 inches, and Ae is 0.050 inches. Values from Table 5 are plotted in FIG. 14. Of course, a variety of alternative values may be used, and a variety of alternative relationships may be obtained.

TABLE 5

| Dm, in. | LoE, in. | Helix Angle, °, where Ap = 3.0 | Helix Angle, °, where Ap = 2.0 | Helix Angle, °, where Ap = 1.0 | Zn |
|---|---|---|---|---|---|
| 1.175 | 0.417 | 7.9 | 11.8 | 22.7 | 7.5 |
| 1.23 | 0.536 | 10.1 | 15.0 | 28.2 | 5.9 |
| 1.28 | 0.609 | 11.5 | 16.9 | 31.3 | 5.2 |
| 1.33 | 0.661 | 12.4 | 18.3 | 33.5 | 4.8 |
| 1.38 | 0.702 | 13.2 | 19.3 | 35.1 | 4.5 |
| 1.43 | 0.735 | 13.8 | 20.2 | 36.3 | 4.3 |
| 1.48 | 0.764 | 14.3 | 20.9 | 37.4 | 4.1 |
| 1.53 | 0.781 | 14.6 | 21.3 | 38.0 | 4.0 |
| 1.58 | 0.757 | 14.2 | 20.7 | 37.1 | 4.1 |
| 1.63 | 0.735 | 13.8 | 20.2 | 36.3 | 4.3 |

Figure 14:
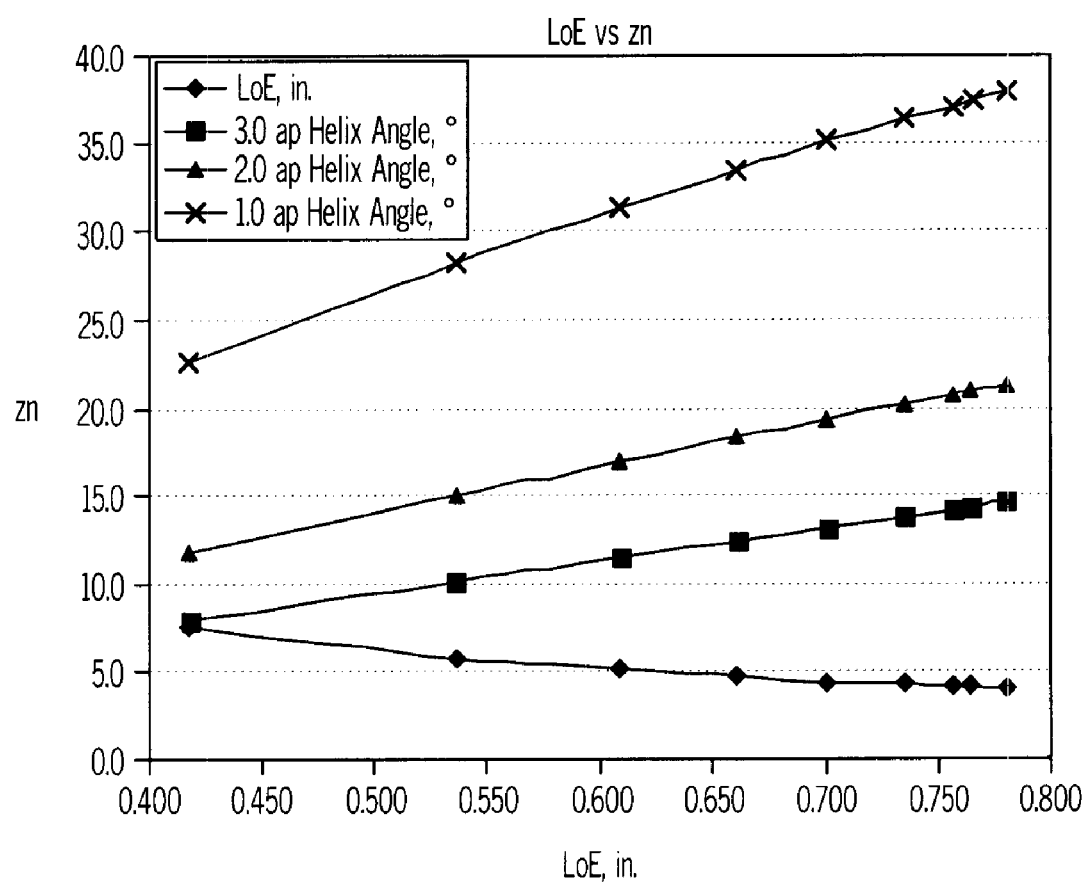
FIG. 14 depicts a plot of "LoE" versus "Zn," with values obtained using the formula of FIG. 7 and data from Table 5.

FIG. 14 depicts a plot of "LoE" versus "Zn," with values obtained using the formula of FIG. 7 and data from Table 5. FIG. 14 may be viewed as showing that the smaller helix angle with more cutting members (22) has the greater effect on the LoE.

It should be understood that, in some settings, it may be desirable to have parameters adjusted such that the data set forth in Table 4 agrees with the data set forth in Table 5. In other words, the formulae on which Tables 4 and 5 are based should yield roughly the same Zn value when the remaining parameters are accounted for. To the extent that the same Zn values are not obtained, adjustable parameters may be adjusted until roughly the same Zn values are obtained.

Example 3

FIG. 15 depicts another exemplary formula that may be used to guide decisions about how to carry out processes described herein. As noted above, the arrangement of parameters and arrows between parameters in FIG. 15 show how certain factors and parameters may be linked together, interact with each other, and/or influence one another.

Unless otherwise noted above, the variables represented in Equations I through XI may be directly correlated with the symbols described in Table 1 above. It should also be understood that Equations I through XI may be used to obtain the output values shown in Tables 6-1 through 6-3, Table 7, Table 8, and FIGS. 15-22. Those Tables and FIGS. Will be described in greater detail below. Equations I through XI may thus be used to guide a human or machine operator when implementing the helical interpolation processes described herein.

The below Tables 6-1 through 6-3 show various parameters and results that may be used and achieved, using a hex of 0.004 inches or a hex of 0.006 inches, in accordance with the formulae shown in FIG. 15 and described above. The data in Tables 6-1 through 6-3 is related in the sense that data associated with an exemplary run shown in row 1 of Table 6-1 continues in row 1 of Table 6-2, and then in row 1 of Table 6-3. Likewise, data associated with an exemplary run shown in row 2 of Table 6-1 continues in row 2 of Table 6-2, and then in row 2 of Table 6-3, and so on. Tables 6-1 through 6-3 may thus be viewed as fitting within a single table that is merely being broken into three sub-tables herein for space considerations. In the examples shown in Tables 6-1 through 6-3, the axial helix angle of tool (20) is approximately 23.0°. Of course, any other suitable helix angle may be used. In addition, the Ap (part) is approximately 6.000 inches, while the Ap (insert) is approximately 0.500 inches. The Apr is between approximately 0.250 inches per orbital revolution of tool (20) and approximately 0.167 inches per orbital revolution of tool (20). The Ae is changed in 0.007 inch increments each run. Again, these values are mere examples, and any others may be used. While values shown in FIG. 15 and Tables 6-1 through 6-3 are expressed in English units, conversion of such units to metric units will be apparent to those of ordinary skill in the art.

TABLE 6-1

| # | Dc, in | Dc/Dm | Zn | MAX Zn | Max Helix Angle, ° | Vc (SFM) | n (rpm) | Dw, in. | Dm, in. | hex, in. |
|---|---|---|---|---|---|---|---|---|---|---|
| 1 | 2.594 | 81.1% | 3 | 37 | 2.1 | 984 | 1449 | 3.191 | 3.198 | 0.004 |
| 2 | 2.594 | 80.9% | 3 | 26 | 2.9 | 984 | 1449 | 3.191 | 3.205 | 0.004 |
| 3 | 2.594 | 80.8% | 3 | 21 | 3.6 | 984 | 1449 | 3.191 | 3.212 | 0.004 |
| 4 | 2.594 | 80.6% | 3 | 19 | 4.1 | 984 | 1449 | 3.191 | 3.219 | 0.004 |
| 5 | 2.594 | 80.4% | 3 | 17 | 4.6 | 984 | 1449 | 3.191 | 3.226 | 0.004 |
| 6 | 2.594 | 80.2% | 3 | 15 | 5.0 | 984 | 1449 | 3.191 | 3.233 | 0.004 |
| 7 | 2.594 | 80.1% | 3 | 14 | 5.3 | 984 | 1449 | 3.191 | 3.239 | 0.004 |
| 8 | 2.594 | 79.9% | 3 | 13 | 5.7 | 984 | 1449 | 3.191 | 3.246 | 0.004 |
| 9 | 2.594 | 79.7% | 3 | 12 | 6.0 | 984 | 1449 | 3.191 | 3.253 | 0.004 |
| 10 | 2.594 | 79.6% | 3 | 12 | 6.3 | 984 | 1449 | 3.191 | 3.260 | 0.004 |
| 11 | 2.594 | 81.1% | 3 | 37 | 2.1 | 984 | 1449 | 3.191 | 3.198 | 0.006 |
| 12 | 2.594 | 80.9% | 3 | 26 | 2.9 | 984 | 1449 | 3.191 | 3.205 | 0.006 |
| 13 | 2.594 | 80.8% | 3 | 21 | 3.6 | 984 | 1449 | 3.191 | 3.212 | 0.006 |
| 14 | 2.594 | 80.6% | 3 | 19 | 4.1 | 984 | 1449 | 3.191 | 3.219 | 0.006 |
| 15 | 2.594 | 80.4% | 3 | 17 | 4.6 | 984 | 1449 | 3.191 | 3.226 | 0.006 |
| 16 | 2.594 | 80.2% | 3 | 15 | 5.0 | 984 | 1449 | 3.191 | 3.233 | 0.006 |
| 17 | 2.594 | 80.1% | 3 | 14 | 5.3 | 984 | 1449 | 3.191 | 3.239 | 0.006 |
| 18 | 2.594 | 79.9% | 3 | 13 | 5.7 | 984 | 1449 | 3.191 | 3.246 | 0.006 |
| 19 | 2.594 | 79.7% | 3 | 12 | 6.0 | 984 | 1449 | 3.191 | 3.253 | 0.006 |
| 20 | 2.594 | 79.6% | 3 | 12 | 6.3 | 984 | 1449 | 3.191 | 3.260 | 0.006 |

TABLE 6-2

| # | Ae, in. | Ae Δ % | Ae/Dc | Ae (true), in. | Ae (true) Δ % | LoE, in. | LoE Δ % | Fz, ipt | Vf₂, IPM | Vf₁, IPM |
|---|---|---|---|---|---|---|---|---|---|---|
| 1 | 0.003 | 100.0% | 0.001 | 0.018 | 100.0% | 0.217 | 100.0% | 0.024 | 103 | 19 |
| 2 | 0.007 | 50.0% | 0.003 | 0.036 | 49.5% | 0.306 | 29.0% | 0.017 | 73 | 14 |
| 3 | 0.010 | 33.3% | 0.004 | 0.053 | 32.7% | 0.373 | 18.0% | 0.014 | 60 | 12 |
| 4 | 0.014 | 25.0% | 0.005 | 0.070 | 24.2% | 0.429 | 13.1% | 0.012 | 53 | 10 |
| 5 | 0.017 | 20.0% | 0.007 | 0.087 | 19.2% | 0.478 | 10.2% | 0.011 | 48 | 9 |
| 6 | 0.021 | 16.7% | 0.008 | 0.103 | 15.9% | 0.521 | 8.4% | 0.010 | 44 | 9 |
| 7 | 0.024 | 14.3% | 0.009 | 0.119 | 13.5% | 0.561 | 7.1% | 0.009 | 41 | 8 |
| 8 | 0.027 | 12.5% | 0.011 | 0.135 | 11.7% | 0.598 | 6.1% | 0.009 | 39 | 8 |
| 9 | 0.031 | 11.1% | 0.012 | 0.151 | 10.3% | 0.631 | 5.4% | 0.008 | 37 | 7 |
| 10 | 0.034 | 10.0% | 0.013 | 0.166 | 9.2% | 0.663 | 4.8% | 0.008 | 35 | 7 |
| 11 | 0.003 | 100.0% | 0.001 | 0.018 | — | 0.217 | — | 0.035 | 154 | 29 |
| 12 | 0.007 | 50.0% | 0.003 | 0.036 | 49.5% | 0.306 | 29.0% | 0.025 | 110 | 21 |
| 13 | 0.010 | 33.3% | 0.004 | 0.053 | 32.7% | 0.373 | 18.0% | 0.021 | 91 | 17 |
| 14 | 0.014 | 25.0% | 0.005 | 0.070 | 24.2% | 0.429 | 13.1% | 0.018 | 79 | 15 |
| 15 | 0.017 | 20.0% | 0.007 | 0.087 | 19.2% | 0.478 | 10.2% | 0.016 | 71 | 14 |
| 16 | 0.021 | 16.7% | 0.008 | 0.103 | 15.9% | 0.521 | 8.4% | 0.015 | 66 | 13 |
| 17 | 0.024 | 14.3% | 0.009 | 0.119 | 13.5% | 0.561 | 7.1% | 0.014 | 61 | 12 |
| 18 | 0.027 | 12.5% | 0.011 | 0.135 | 11.7% | 0.598 | 6.1% | 0.013 | 58 | 12 |
| 19 | 0.031 | 11.1% | 0.012 | 0.151 | 10.3% | 0.631 | 5.4% | 0.013 | 55 | 11 |
| 20 | 0.034 | 10.0% | 0.013 | 0.166 | 9.2% | 0.663 | 4.8% | 0.012 | 52 | 11 |

TABLE 6-3

| # | Vf₁ Δ % | sec | Circular, min | sec | Helical Apr1, min | Helical Apr2, min |
|---|---|---|---|---|---|---|
| 1 | 100.0% | 8.80 | 0.147 | 46.06 | 0.768 | 0.768 |
| 2 | 28.0% | 12.36 | 0.206 | 64.72 | 1.079 | 1.079 |
| 3 | 16.9% | 15.04 | 0.251 | 78.77 | 1.313 | 1.313 |
| 4 | 11.9% | 17.26 | 0.288 | 90.39 | 1.506 | 1.507 |
| 5 | 9.0% | 19.18 | 0.320 | 100.44 | 1.674 | 1.674 |
| 6 | 7.2% | 20.89 | 0.348 | 109.37 | 1.823 | 1.823 |
| 7 | 5.9% | 22.43 | 0.374 | 117.43 | 1.957 | 1.957 |
| 8 | 4.9% | 23.84 | 0.397 | 124.81 | 2.080 | 2.080 |
| 9 | 4.2% | 25.14 | 0.419 | 131.62 | 2.194 | 2.194 |
| 10 | 3.6% | 26.35 | 0.439 | 137.96 | 2.299 | 2.299 |
| 11 | — | 5.86 | 0.098 | 30.71 | 0.512 | 0.512 |
| 12 | 28.0% | 8.24 | 0.137 | 43.15 | 0.719 | 0.719 |
| 13 | 16.9% | 10.03 | 0.167 | 52.51 | 0.875 | 0.875 |
| 14 | 11.9% | 11.51 | 0.192 | 60.26 | 1.004 | 1.004 |
| 15 | 9.0% | 12.79 | 0.213 | 66.96 | 1.116 | 1.116 |
| 16 | 7.2% | 13.92 | 0.232 | 72.91 | 1.215 | 1.215 |
| 17 | 5.9% | 14.95 | 0.249 | 78.29 | 1.305 | 1.305 |
| 18 | 4.9% | 15.89 | 0.265 | 83.21 | 1.387 | 1.387 |
| 19 | 4.2% | 16.76 | 0.279 | 87.75 | 1.462 | 1.463 |
| 20 | 3.6% | 17.56 | 0.293 | 91.97 | 1.533 | 1.533 |

The values in Tables 6-1 through 6-3 are merely exemplary, and any other suitable values or ranges may be used. Furthermore, each and every number provided in Tables 6-1 through 6-3 is merely approximate, not necessarily absolute.

In some variations, some of the parameters shown in FIG. 15, and the corresponding values/ranges shown in Tables 6-1 through 6-3, may be regarded as "inputs" into the formula shown in FIG. 15; while others may be regarded as "outputs." In other words, some factors or parameters may be predetermined ("inputs"), while other factors or parameters ("outputs") may be calculated or otherwise determined or achieved based at least in part upon the predetermined factors or parameters. In particular, the following parameters may be regarded as "inputs": Dc, Ap (part), LoE, hex, Tool Axial Helix Angle, Ap (insert), Ae, Vc, and Dm. The following parameters may be regarded as "outputs": Vf₁, Vf₂, n, Zn, Fz, Apr, Ae (true), and Dc/Dm. Of course, these arrangements are merely exemplary, and any factors or parameters may be regarded as "inputs" or "outputs" as desired.

Figure 16:
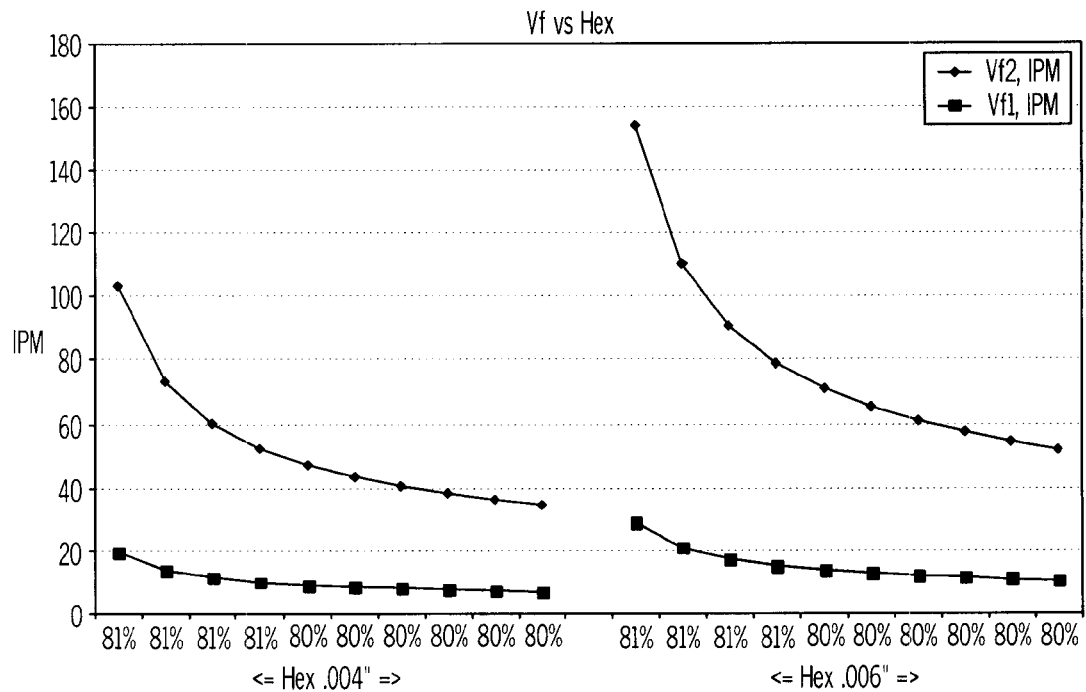
FIG. 16 depicts a plot of "Vf" versus "hex," with values obtained using the formula of FIG. 15 and data from Tables 6-1 through 6-3.

FIG. 16 depicts a plot of "VF" versus "hex," with values obtained using the formula of FIG. 15 and data from Tables 6-1 through 6-3. The curves show that, below 75% Dc/Dm, the feed rate is substantially constant (flat). Above 75% Dc/Dm, the curve turns upward for improved feed rate and productivity. This may be regarded as the high speed machining zone. The curve is even steeper at the 0.006" hex. At about 85% Dc/DM, one may start to reach the physical limits of practical tool engagement in some settings.

Figure 17:
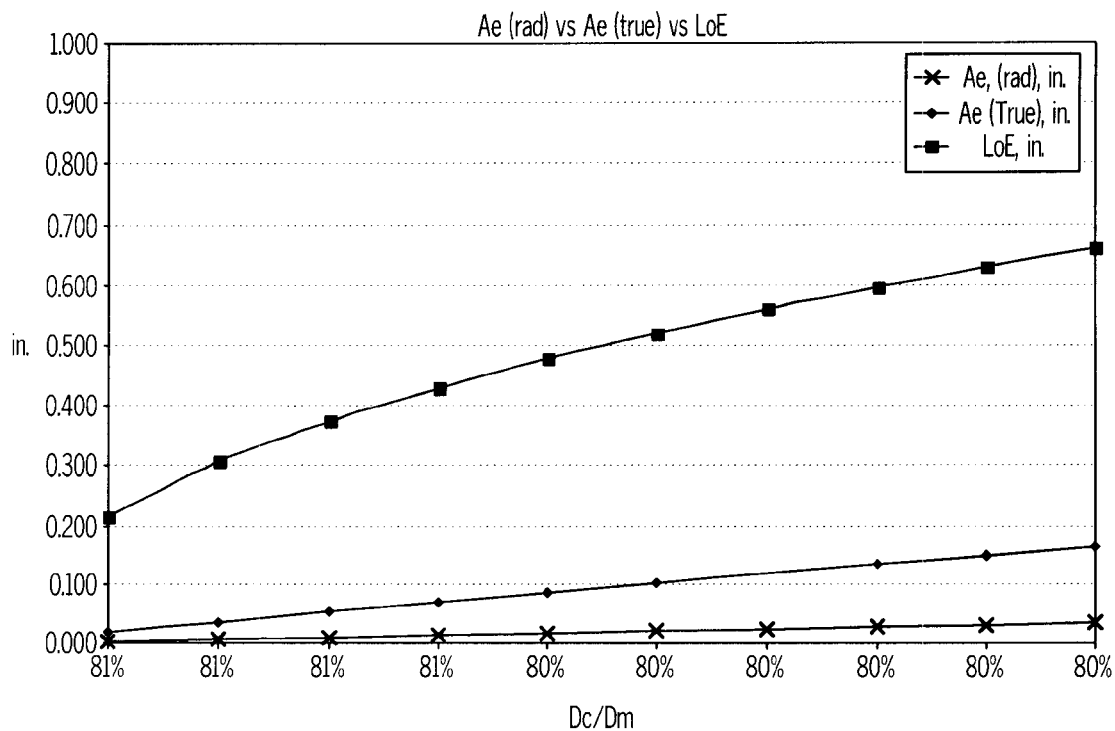
FIG. 17 depicts a plot of "Ae" versus "Ae (true)" versus "LoE," with values obtained using the formula of FIG. 15 and data from Tables 6-1 through 6-3.

FIG. 17 depicts a plot of "Ae" versus "Ae (true)" versus "LoE," with values obtained using the formula of FIG. 15 and data from Tables 6-1 through 6-3. As shown in FIG. 17, LoE gets shorter in the range of about 75% Dc/Dm to about 85% Dc/Dm. Shorter engagement time may translate into better tool life in some settings, so it may be desirable to favor fast engagement time.

Figure 18:
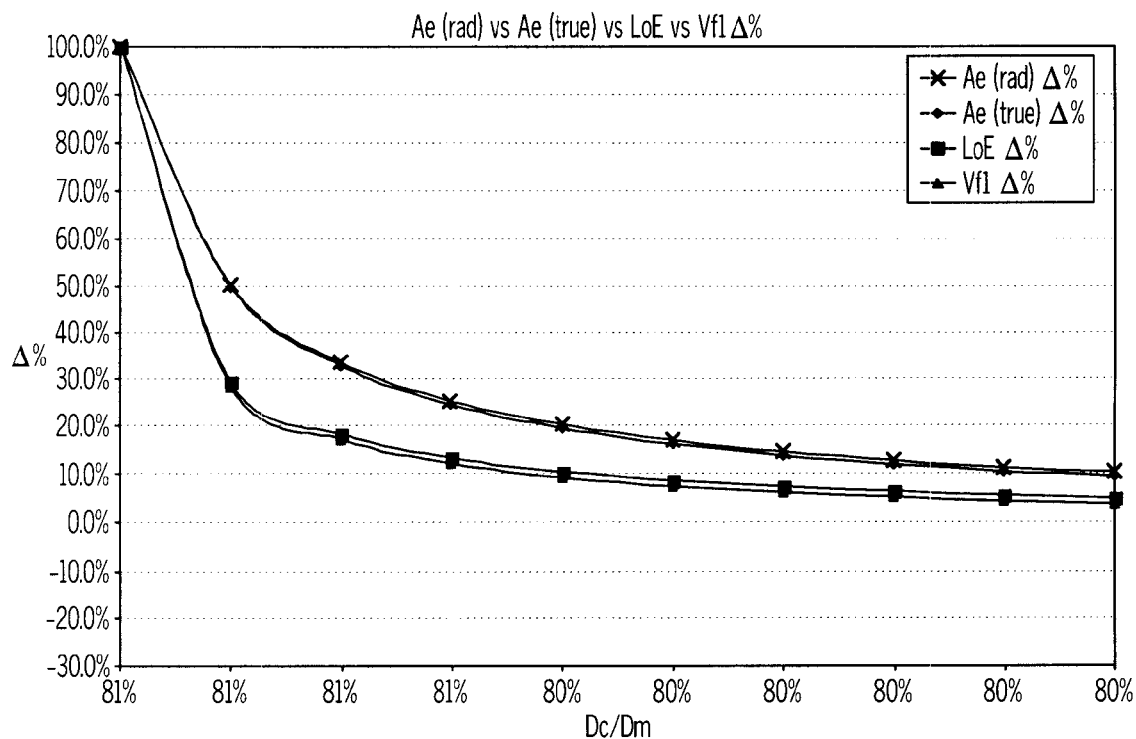
FIG. 18 depicts a plot of change in "Ae" versus "Ae (true)" versus "LoE" versus "Vf1," with values obtained using the formula of FIG. 15 and data from Tables 6-1 through 6-3.

FIG. 18 depicts a plot of change in "Ae" versus "Ae (true)" versus "LoE" versus "Vf1," with values obtained using the formula of FIG. 15 and data from Tables 6-1 through 6-3. As shown in FIG. 18, at about 85% Dc/DM, one may start to reach the physical limits of practical tool engagement in some settings.

Figure 19:
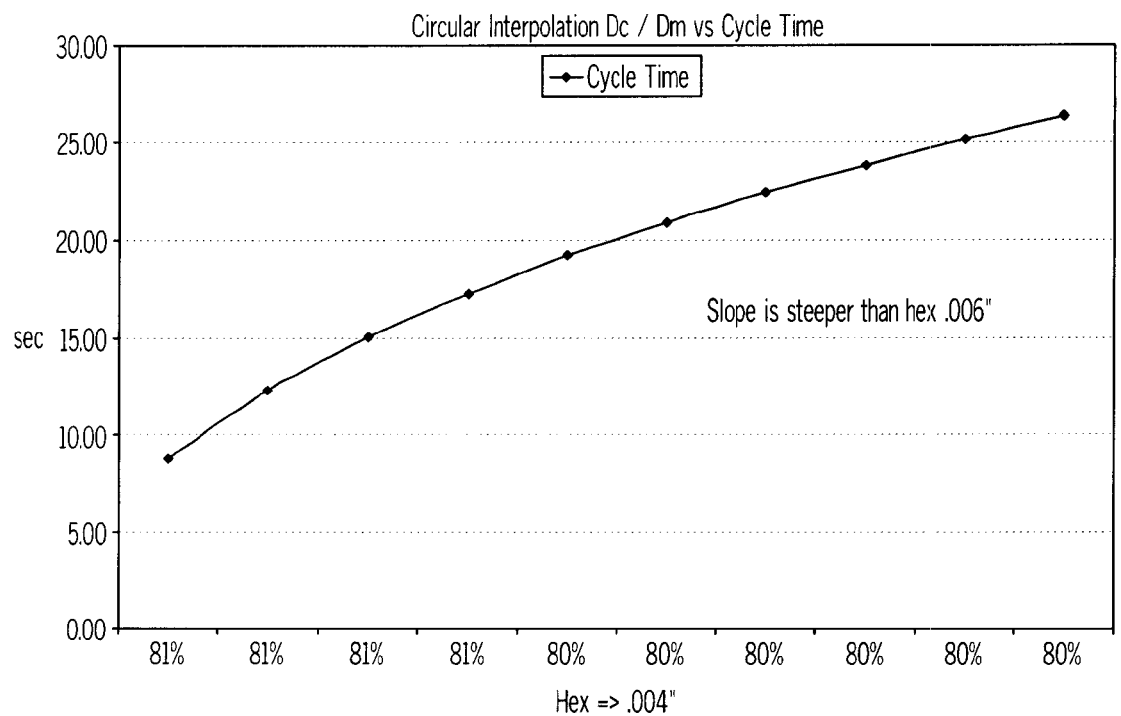
FIG. 19 depicts a plot of "Dc/Dm" ratios versus cycle time, with values obtained using the formula of FIG. 15 and data from Tables 6-1 through 6-3, with "hex" set at 0.004 inches.
Figure 20:
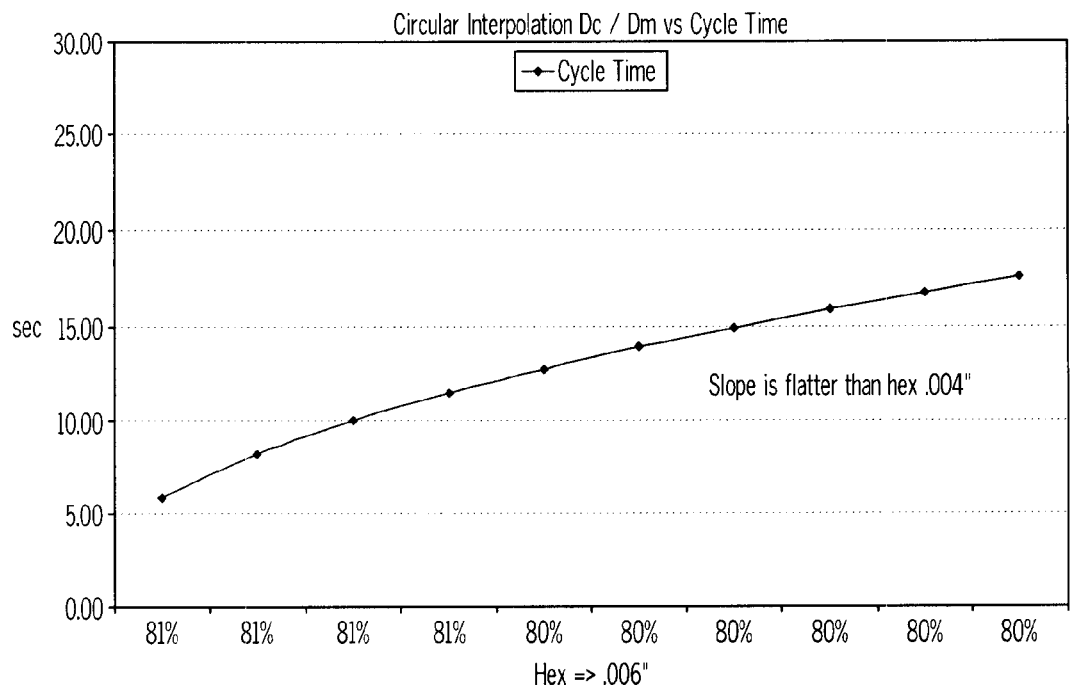
FIG. 20 depicts a plot of "Dc/Dm" ratios versus cycle time, with values obtained using the formula of FIG. 15 and data from Tables 6-1 through 6-3, with "hex" set at 0.006 inches.

FIG. 19 depicts a plot of "Dc/Dm" ratios versus cycle time, with values obtained using the formula of FIG. 15 and data from Tables 6-1 through 6-3, with "hex" set at 0.004 inches. FIG. 20 depicts a plot of "Dc/Dm" ratios versus cycle time, with values obtained using the formula of FIG. 15 and data from Tables 6-1 through 6-3, with "hex" set at 0.006 inches. As shown in FIGS. 19-20 collectively, even though the cycle time is relatively better for 0.006 inch "hex," the relative improvement in the cycle time range for 0.004 inch "hex" may be viewed as being relatively better because the slope of the curve is steeper.

The below Table 7 shows exemplary relationships between the axial cylinder length Ap (part), the axial helix angle, and the number of cutter teeth Zn. In this example, Dc is 2.594 inches, Dw is 3.191 inches, Dm is 3.198 inches, and Ae is 0.007 inches. Values from Table 7 are plotted in FIG. 21. Of course, a variety of alternative values may be used, and a variety of alternative relationships may be obtained.

TABLE 7

| Ap (part), in. | Helix Angle, ° | Zn |
|---|---|---|
| 1.0 | 30.0 | 14.1 |
| 1.0 | 20.0 | 22.4 |
| 1.0 | 10.0 | 46.2 |
| 2.0 | 30.0 | 7.1 |
| 2.0 | 20.0 | 11.2 |
| 2.0 | 10.0 | 23.1 |
| 3.0 | 30.0 | 4.7 |
| 3.0 | 20.0 | 7.5 |
| 3.0 | 10.0 | 15.4 |
| 4.0 | 30.0 | 3.5 |
| 4.0 | 20.0 | 5.6 |
| 4.0 | 10.0 | 11.6 |
| 5.0 | 30.0 | 2.8 |
| 5.0 | 20.0 | 4.5 |
| 5.0 | 10.0 | 9.2 |
| 6.0 | 30.0 | 2.4 |
| 6.0 | 20.0 | 3.7 |
| 6.0 | 10.0 | 7.7 |

Figure 21:
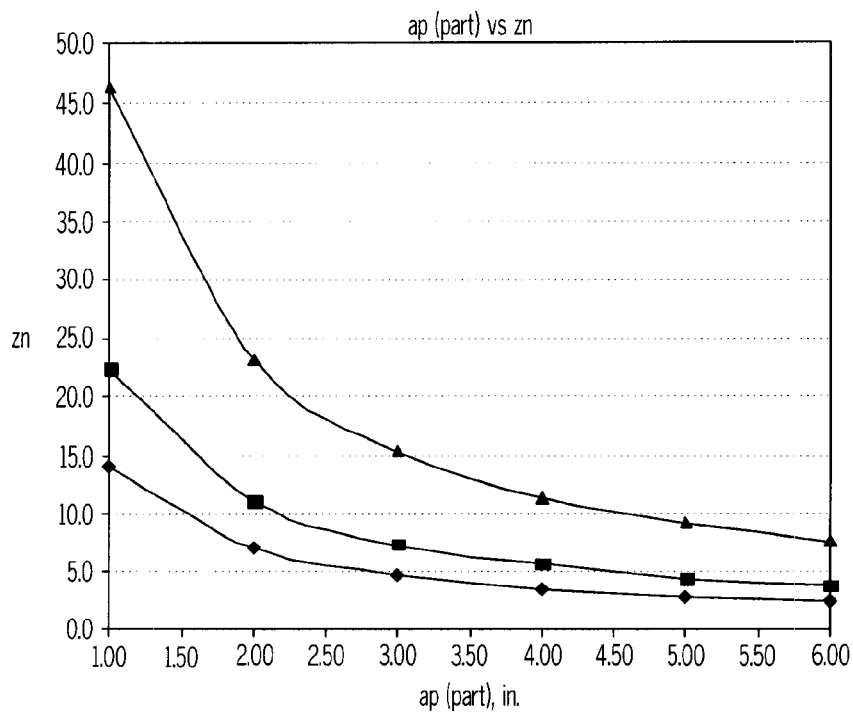
FIG. 21 depicts a plot of "Ap (part)" versus "Zn," with values obtained using the formula of FIG. 15 and data from Table 7.

FIG. 21 depicts a plot of "Ap (part)" versus "Zn," with values obtained using the formula of FIG. 15 and data from Table 7.

The below Table 8 shows exemplary relationships between the length of engagement LoE and the number of cutter teeth Zn. In this example, Dc is 2.594 inches, Dw is 3.191 inches, Ap (part) is 6.000 inches, and Ae is 0.007 inches. Values from Table 8 are plotted in FIG. 22. Of course, a variety of alternative values may be used, and a variety of alternative relationships may be obtained.

TABLE 8

| Dm, in. | LoE, in. | Helix Angle, °, where Ap = 6.0 | Helix Angle, °, where Ap = 3.0 | Helix Angle, °, where Ap = 1.0 | Zn |
|---|---|---|---|---|---|
| 3.198 | 0.219 | 2.1 | 4.2 | 12.4 | 37.1 |
| 3.21 | 0.309 | 2.9 | 5.9 | 17.2 | 26.4 |
| 3.21 | 0.377 | 3.6 | 7.2 | 20.7 | 21.6 |
| 3.22 | 0.434 | 4.1 | 8.2 | 23.4 | 18.8 |
| 3.23 | 0.483 | 4.6 | 9.1 | 25.8 | 16.9 |
| 3.23 | 0.527 | 5.0 | 10.0 | 27.8 | 15.5 |
| 3.24 | 0.567 | 5.4 | 10.7 | 29.6 | 14.4 |
| 3.25 | 0.604 | 5.7 | 11.4 | 31.1 | 13.5 |
| 3.25 | 0.638 | 6.1 | 12.0 | 32.5 | 12.8 |
| 3.26 | 0.670 | 6.4 | 12.6 | 33.8 | 12.2 |

Figure 22:
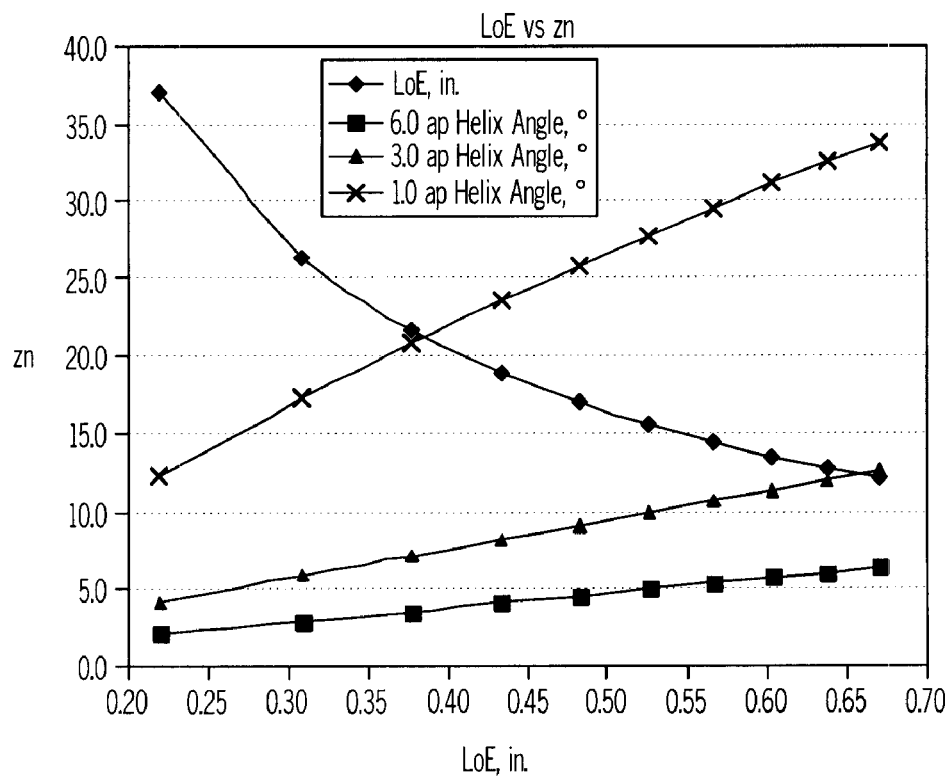
FIG. 22 depicts a plot of "LoE" versus "Zn," with values obtained using the formula of FIG. 15 and data from Table 8.

FIG. 22 depicts a plot of "LoE" versus "Zn," with values obtained using the formula of FIG. 15 and data from Table 8. FIG. 22 may be viewed as showing that the smaller helix angle with more cutting members (22) has the greater effect on the LoE.

It should be understood that, in some settings, it may be desirable to have parameters adjusted such that the data set forth in Table 7 agrees with the data set forth in Table 8. In other words, the formulae on which Tables 7 and 8 are based should yield roughly the same Zn value when the remaining parameters are accounted for. To the extent that the same Zn values are not obtained, adjustable parameters may be adjusted until roughly the same Zn values are obtained.

Figure 23:
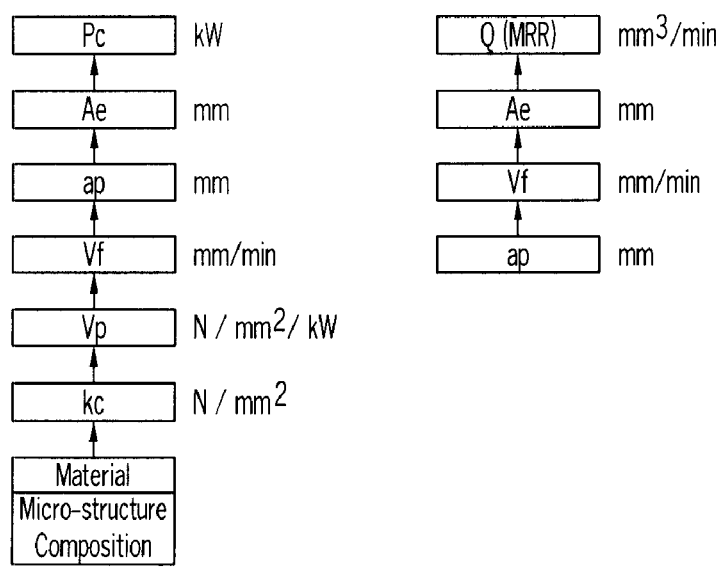
FIG. 23 depicts an exemplary general formula for establishing net power consumption and the volume of material removed from a workpiece.

FIG. 23 depicts an exemplary general formula for establishing net power consumption "Pc" and the volume of material "Q" removed from a workpiece (40). In some versions of the process of the present example, tool (20) is driven by a spindle load of between approximately 8 amps and approximately 10 amps, or between approximately 2.1 kW and approximately 2.6 kW. The net cut of workpiece (40) by cutting members (22) may consume between approximately 1.0 kW and approximately 1.4 kW. Of course, any other suitable power levels may be used. For instance, higher power may affect results.

Figure 24:
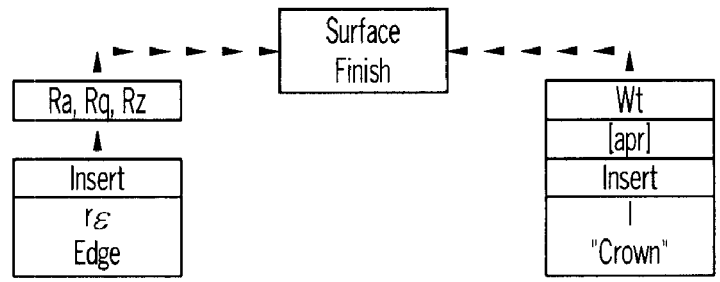
FIG. 24 depicts an exemplary general formula for establishing the surface finish of a bore.

FIG. 24 depicts an exemplary general formula for establishing the surface finish of a bore (50). Thus, in some versions of the process of the present example, the only operational parameter that affects the surface finish of a bore (50) is the "Apr," or the helix height or displacement in z-direction (300) per helical/orbital revolution as tool (20) is advanced into bore (50). The structural features of cutting member (22), such as "re" and "I" may also affect the surface finish of bore (50). Alternatively, other factors and parameters, such as structural variables and operational parameters, may influence the surface finish of bore (50).

Several other factors or variables that may be taken into consideration when determining how to implement a helical interpolation process or other process on a workpiece (40). Such additional factors or variables may include, but need not be limited to, the following: material of which blade members (22) are formed; number of passes, or the number of times tool (20) is advanced into workpiece (40) (e.g., a single pass or multiple passes may be used); depth of desired bore (50); material of which workpiece is formed (40); the thrust force with which tool (20) is advanced in the z-direction; the orbital speed at which tool (20) is moved in an orbital motion about bore axis (54); spacing of blade members (22) on tool (20) (e.g., radial spacing, angular spacing, longitudinal spacing, helical spacing, etc.); and/or the ramp angle of tool axis (24) relative to bore axis (54) (e.g., may be determined by "Ap (part)" and diameter of bore (50), etc.). Ways in which these factors or variables may be taken into account when carrying out the processes described herein will be apparent to those of ordinary skill in the art in view of the teachings herein. Still other factors or variables will be apparent to those of ordinary skill in the art in view of the teachings herein.

While some values and ranges of some variables or operational parameters have been explicitly disclosed herein, it will be appreciated that such values and ranges are merely exemplary. Furthermore, while some values and ranges of variables or operational parameters may yield ideal results compared to other values and ranges of variables or operational parameters, it will be appreciated that different ratios of variables or operational parameters may yield ideal results compared to other ratios of variables or operational parameters in different settings. For instance, some variables or operational parameters may have relationships such that varying one will warrant a corresponding variation in one or more other variables or operational parameters. In some variations, there is an important relationship between "Apr" (axial feed increment or pitch) and "LoE" (length of engagement), such that varying one will warrant a corresponding variation in the other. Similarly, "LoE," "Dw," "Dm," and "Zn" may be set such that only a single blade member (22) will be engaging workpiece (40) at any given time in the present example. In some variations, and by way of example only, the "Apr" value may be selected as being approximately one half of the "Ap (insert)" value; approximately one third of the "Ap (insert)" value; or some fraction of the "Ap (insert)" value between a third and a half. In other variations, "Apr" is not influenced by "Ap (insert)" in such a way; or they have some other relationship. As another merely illustrative, non-limiting example, in some variations, the "Dc" value may be selected as being approximately "Dm"*0.85. Alternatively, "Dc" may be selected as a product of "Dm" multiplied by any other factor as an alternative to 0.85. Similarly, in other variations, "Dc" is not influenced by "Dm" in such a way, or they have some other relationship.

Of course, "ideal relationships" or "ideal ratios" of variables or operational parameters may come in a variety of forms, including but not limited to direct proportions, indirect proportions, complex functions, etc. Ideal relationships may also vary based on a variety of factors, including but not limited to the material(s) of which workpiece (40) is formed, the work sought to be done on workpiece (40), etc. Ideal relationships or ratios between variables or operational parameters will be apparent to those of ordinary skill in the art in view of the teachings herein.

In the present example, where tool (20) is used to form bore (50) in workpiece (40) formed of CGI material in accordance with processes described herein, a complete length of bore (50) may be formed in a single pass by tool (20). Upon completion of this initial boring pass, the exemplary process may proceed directly to a honing operation. It will therefore be appreciated that a step of semi-finishing boring may be eliminated (though a step of semi-finish boring may alternatively nevertheless be undertaken). In other words, the process of the present example may allow for a smooth transition from a rough cutting operation directly to a finish honing operation (e.g., CNC honing). Without being limited by theory, this may be attributable to the fact that, in certain versions of the processes described herein, a helical cusp profile is produced in bore wall (52). In other embodiments, another process is used for rough boring, and helical interpolation is used to perform semi and/or finish boring, with yet another process used for honing. Of course, helical interpolation may be used in any or all steps of rough boring, semi/finish boring, and/or honing, among other steps or processes in which helical interpolation may be used. Other ways in which helical interpolation may be used will be apparent to those of ordinary skill in the art in view of the teachings herein.

Figure 25:
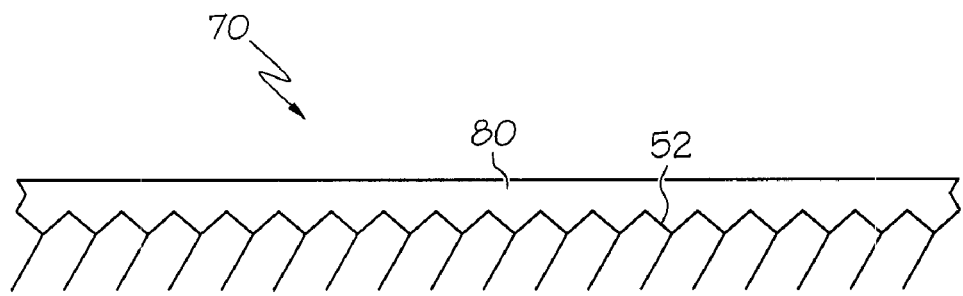
FIG. 25 depicts an exemplary conventional bore surface profile.
Figure 26:
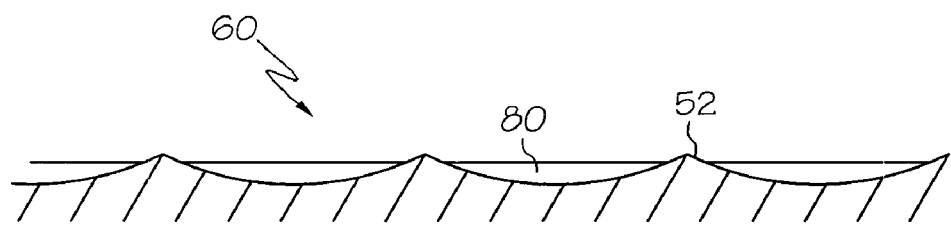
FIG. 26 depicts an exemplary helical bore surface profile.

An exemplary helical cusp profile (60) is illustrated in FIG. 26, and is believed to be attributable to helical interpolation; as contrasted with the profile (70) shown in FIG. 25, which is often associated with boring processes that do not employ helical interpolation. As is known in the art, conventional boring processes may tend to produce what is known as a "white layer" (80) of material adjacent to a bore surface (52), generally parallel to the generated surface profile, such as is shown in FIG. 25. In some embodiments, a helical cusp profile (60) will have no white layer or virtually no white layer (80), such as is shown in FIG. 26; whereas a profile (70) produced with non-interpolation methods may have a significantly greater white layer (80), such as is shown in FIG. 25. Such a difference in white layer (80), along with the differences in the number of surface features per unit area for each profile (60, 70), may result in the differing honing needs for associated bore surfaces (52). In other words, a helical cusp profile (60) with little if any white layer (80) may need less honing than a profile (70) having a greater white layer (80). Alternatively, a process using helical interpolation may produce a profile similar to profile (70), and may yield a significant white layer (80); while a process that does not employ helical interpolation may produce a profile similar to profile (60), may yield virtually no white layer (80). Accordingly, the inventors contemplate a variety of types of profiles (60, 70) and white layers (80) being possibly produced in accordance with processes described herein, and do not intend to be limited by associated theories described herein.

In an illustrative example, a cylinder is rough bored, using helical interpolation, in approximately 14 seconds. The cylinder is then semi and finish bored, using helical interpolation, in approximately 22 seconds. Finally, the cylinder is CNC honed in approximately 50 seconds to approximately 85 seconds. With no other steps being performed in this particular non-limiting example, the bore (50) is completed in approximately 86 seconds to approximately 121 seconds. Of course, any other processing times and/or steps may be used, as well as methods for performing such steps. Furthermore, any suitable tool (20) may be used to perform any such steps; and helical interpolation or other processes may be used in any or all such steps.

In the present example, tool (20) is used in a helical interpolation process to produce, form, hone, or otherwise work on a substantially cylindrical bore (50) (e.g., a bore (50) having a substantially straight bore surface (52) that uniformly runs substantially parallel to tool axis (24)). One merely illustrative example of such a bore (50) may include a conventional cylinder in an engine block (e.g., a diesel engine block). However, it will be appreciated that tool (20) or some other device may be used in a helical interpolation process to produce, form, hone, or otherwise work on a bore that does not necessarily have a substantially cylindrical shape. For instance, a helical interpolation process may be used to produce a shaped bore or a bore that does not have a uniform cross-section along its length.

In some situations, it may be desirable to produce a shaped bore rather than a purely cylindrical bore (50). For instance, the cylinders in some engine blocks may tend to deform during normal operating conditions of the engine. Such deformation may result from heat and/or other factors. The shaping of a bore (50) during the formation of a cylinder in an engine block may take such deformation into account, such as by "anticipating" the deformation. For instance, the bore (50) of an engine cylinder may be formed such that, when the engine is at rest, the engine cylinder has a non-cylindrical shape. However, when the same engine is operated under normal conditions (e.g., such that sufficient heat has built up within the cylinder), the engine cylinder "deforms" to reach a more purely cylindrical shape. Thus, if a region of an engine cylinder tends to deform outward during normal operation of the engine, that region of the engine cylinder bore (50) may be shaped inward during the forming process, in anticipation of the outward deformation that will occur during normal operation of the engine. Similarly, if a region of an engine cylinder tends to deform inward during normal operation of the engine, that region of the engine cylinder bore (50) may be shaped outward during the forming process, in anticipation of the outward deformation that will occur during normal operation of the engine.

It will be appreciated that the above-described deformation may be on the order of microns. It will also be appreciated that such deformation may be a function of the type of engine, the operational characteristics of the engine, the material that the engine block is formed of, and/or a variety of other factors. Of course, the tools and processes described herein may be used to shape a bore (50) to account for such deformations or for other reasons, and using a variety of techniques. Furthermore, intentional deformations may be symmetric about the axis of bore (50), asymmetric, and/or have other properties.

Any of the processes described herein may be used with features of the "flush fine" process by Makino, Inc. of Cincinnati, Ohio, which is known in the art. In particular, chips, pieces of workpiece (40), and/or other debris may be flushed away from workpiece (40) using air and/or coolant as tool (20) engages workpiece (40), minimizing heat generated between tool (20) and workpiece (40). Such air or coolant may be provided by a nozzle (not shown), through tool (20), and/or in any other suitable fashion. By way of example only, coolant used in this scenario may function as a lubricant in addition to functioning as a coolant at the interface of tool (20) and workpiece (40).

Having shown and described various embodiments of the present invention, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, embodiments, geometries, materials, dimensions, ratios, steps, and the like discussed above are illustrative and are not required. Accordingly, the scope of the present invention should be considered in terms of the following claims and is understood not to be limited to the details of structure and operation shown and described in the specification and drawings.

What is claimed is:

1. A method for working on a workpiece, the method comprising:
    (a) providing a tool, wherein the tool defines a first axis extending longitudinally along the center of the tool, wherein the tool is rotatable about the first axis, wherein the tool has a periphery, a first diameter, and a selected number of cutting elements;
    (b) providing a workpiece, wherein the workpiece has a bore having a second diameter and a bore length;
    (c) rotating the tool about the first axis at a selected rate of rotation;
    (d) moving the tool in an orbital motion about a second axis, wherein the second axis is separate from but parallel to the first axis, wherein the acts of rotating the tool and moving the tool in an orbital motion are performed contemporaneously, wherein each cutting element moves at a cutting element speed during the acts of rotating the tool and moving the tool in an orbital motion; and
    (e) advancing the tool into the bore of the workpiece at a selected linear rate of advancement to successively engage the cutting elements of the tool with the workpiece to enlarge the bore in the workpiece to a third diameter by cutting chips from the workpiece, wherein the third diameter is greater than the second diameter, wherein the tool continues to rotate about the first axis and orbit about the second axis during the act of advancing the tool, such that the tool is advanced at a helix angle, wherein the cutting elements are advanced at a selected peripheral linear feed rate during the act of advancing the tool;
    wherein the linear rate of advancement is selected based at least in part on the rate of rotation.

2. The method of claim 1, wherein the linear rate of advancement is selected further based at least in part on the first diameter.

3. The method of claim 2, wherein the linear rate of advancement is selected further based at least in part on the third diameter.

4. The method of claim 3, wherein the rate of advancement is selected using the formula:

$$Vf_1 = Vf_2 * ((Dm - Dc)/Dm), \quad [1]$$

wherein $Vf_1$=the selected linear rate of advancement of the tool,
   wherein $Vf_2$=the linear rate of advancement at the periphery of the tool,
   wherein Dc=the first diameter, and
   wherein Dm=the third diameter.

5. The method of claim 1, wherein the peripheral feed rate is selected based at least in part on the rate of rotation at which the tool rotates about the first axis.

6. The method of claim 5, wherein the peripheral feed rate is selected further based at least in part on the number of cutting elements.

7. The method of claim 6, wherein the peripheral feed rate is selected further based at least in part on the distance traveled by each cutting element in each rotation of the tool about the first axis.

8. The method of claim 7, wherein the peripheral feed rate is selected using the formula:

$$Vf_2 = n * Zn * Fz, \quad [2]$$

wherein $Vf_2$=the selected linear rate the cutting elements are advanced at during the act of advancing the tool,
   wherein n=rate of rotation at which the tool rotates about the first axis,
   wherein Zn=the number of cutting elements, and
   wherein Fz=the distance traveled by each cutting element in each rotation of the tool about the first axis.

9. The method of claim 1, wherein the rate of rotation is selected based at least in part on the speed of the cutting elements during the acts of rotating the tool about the first axis, moving the tool in an orbital motion about the second axis, and advancing the tool.

10. The method of claim 9, wherein the rate of rotation is selected further based at least in part on the first diameter.

11. The method of claim 10, wherein the rate of rotation is selected using the formula:

$$n = Vc * 3.82/Dc, \quad [3]$$

wherein n=rate of rotation at which the tool rotates about the first axis,
   wherein Vc=the speed of the cutting elements during the acts of rotating the tool about the first axis, moving the tool in an orbital motion about the second axis, and advancing the tool, and
   wherein Dc=the first diameter.

12. The method of claim 1, wherein the number of cutting elements is selected based at least in part on the first diameter.

13. The method of claim 12, wherein the number of cutting elements is selected based further based at least in part on the helix angle.

14. The method of claim 13, wherein the number of cutting elements is selected based further based at least in part on the axial length of the bore.

15. The method of claim 14, wherein the number of cutting elements is selected using the formula:

$$Zn = ((\pi * Dc)/(\tan(\theta * (\pi c/180))) * Ap), \quad [4]$$

wherein Zn=the number of cutting elements,
   wherein Dc=the first diameter,
   wherein θ=the helix angle, and
   wherein Ap=the axial length of the bore.

16. The method of claim 1, wherein each cutting member travels a distance during each revolution of the tool about the first axis based at least in part on the first diameter.

17. The method of claim 16, wherein each cutting member travels a distance during each revolution of the tool about the first axis based further at least in part on the maximum thickness of each chip taken from the workpiece by each blade member.

18. The method of claim 16, wherein each cutting member travels a distance during each revolution of the tool about the first axis based further at least in part on the depth at which each blade member cuts into the workpiece, measured along a radial dimension.

19. The method of claim 18, wherein each cutting member travels a distance during each revolution of the tool about the first axis selected using the formula:

$$Fz = Dc * \text{hex}/\sqrt{((Dc^2 - (Dc - 2*Ae)^2))}, \quad [5]$$

wherein Fz=the distance traveled by each blade member during each revolution of the tool about the first axis,
wherein Dc=the first diameter,
wherein hex=the maximum thickness of each chip taken from the workpiece by each blade member, and
wherein Ae=the depth at which each blade member cuts into the workpiece, measured along a radial dimension.

20. The method of claim 1, wherein the linear rate of advancement is selected such that the tool is advanced linearly during each revolution of the tool about the second axis at a distance based at least in part on the third diameter.

21. The method of claim 20, wherein the linear rate of advancement is selected such that the tool is advanced linearly during each revolution of the tool about the second axis at a distance selected using the formula:

$$Apr = Dm/3, \quad [6]$$

wherein Apr=the distance at which the tool is advanced during each revolution of the tool about the second axis during the act of advancing the tool, and
wherein Dm=the third diameter.

22. The method of claim 1, wherein, during the act of advancing the tool, each cutting member engages the workpiece during each successive engagement for a circumferential distance based at least in part on the first diameter.

23. The method of claim 22, wherein, during the act of advancing the tool, each cutting member engages the workpiece during each successive engagement for a circumferential distance based further at least in part on the second diameter.

24. The method of claim 23, wherein, during the act of advancing the tool, each cutting member engages the workpiece during each successive engagement for a circumferential distance based further at least in part on the third diameter.

25. The method of claim 24, wherein, during the act of advancing the tool, each cutting member engages the workpiece during each successive engagement for a circumferential distance selected using the formula:

$$LoE = Dc/2 * \sin^{-1}\left(\left(2*\sqrt{(((Dm - 2*((Dm - Dw)/2))/2)^2 - ((Dc^2/4 - (Dm - 2*((Dm - Dw)/2))^2/4 - ((Dm - Dc)/2)^2)/ (2*((Dm - Dc)/2)))^2)/Dc}\right)\right) \quad [7]$$

wherein LoE=the circumferential distance at which each blade member engages the workpiece during each successive engagement,
wherein Dc=the first diameter,
wherein Dm=the third diameter, and
wherein Dw=the second diameter.

26. The method of claim 1, wherein the tool is selected such that the first diameter is between approximately 75% and approximately 85% of the third diameter.

27. The method of claim 1, wherein the tool is selected such that the ratio of the first diameter to the bore length is approximately 3:1 or less.

28. The method of claim 1, further comprising performing a rough cutting pass on the workpiece to form the bore with the second diameter, wherein the act of performing the rough cutting pass comprises advancing the tool into the workpiece while contemporaneously rotating the tool about the first axis and moving the tool in an orbital motion about the second axis; wherein the act of advancing the tool into the bore of the workpiece comprises finish honing the bore in the workpiece; wherein the method is performed without a semi-finish boring pass between the acts of performing a rough cutting pass and finish honing the bore.

29. The method of claim 1, wherein the act of advancing further comprising forming a helical cusp profile in the bore, wherein the helical cusp profile comprises a plurality of peaks and valleys with white matter situated in the valleys, wherein the white matter does not extend over the peaks.

30. The method of claim 1, wherein the workpiece is formed of compacted graphite iron.

31. The method of claim 30, wherein the cutting elements are engaged with the workpiece for up to approximately 14 seconds to rough bore the workpiece, the method further comprising disengaging the cutting elements from the workpiece after no more than approximately 14 seconds of engagement between the cutting elements and the workpiece.

32. The method of claim 31, further comprising cutting the bore in the workpiece and honing the bore in the workpiece, wherein the acts of cutting the bore and honing the bore each comprise advancing the tool into the workpiece while contemporaneously rotating the tool about the first axis and moving the tool in an orbital motion about the second axis, wherein the acts of cutting the bore and honing the bore are together completed in approximately 86 seconds to approximately 121 seconds.

33. A method for working on a workpiece, the method comprising:
(a) providing a tool, wherein the tool defines a first axis extending longitudinally along the center of the tool, wherein the tool is rotatable about the first axis, wherein the tool has a periphery, a first diameter, and a plurality of cutting elements;
(b) providing a workpiece, wherein the workpiece has a bore having a second diameter and a bore length;
(c) rotating the tool about the first axis;
(d) moving the tool in an orbital motion about a second axis, wherein the second axis is separate from but parallel to the first axis, wherein the acts of rotating the tool and moving the tool in an orbital motion are performed contemporaneously; and
(e) advancing the tool into the bore of the workpiece to successively engage the cutting elements of the tool with the workpiece to enlarge the bore in the workpiece to a third diameter, wherein the third diameter is greater than the second diameter, wherein the tool continues to rotate about the first axis and orbit about the second axis during the act of advancing the tool, such that the tool is advanced at a helix angle;
wherein the tool is selected such that the first diameter is between approximately 75% and approximately 85% of the third diameter, and such that the ratio of the first diameter to the bore length is approximately 3:1 or less.

34. A method for working on a workpiece, the method comprising:
(a) providing a first tool, wherein the first tool defines a first axis extending longitudinally along the center of the first tool, wherein the first tool is rotatable about the first axis, wherein the first tool has a periphery, a first diameter, and a plurality of cutting elements;
(b) providing a second tool, wherein the second tool defines a second axis extending longitudinally along the center of the second tool, wherein the second tool is rotatable about the second axis, wherein the second tool has a periphery, a second diameter, and a plurality of finish honing elements;

(c) providing a workpiece, wherein the workpiece is formed at least in part of compacted graphite iron;

(d) rotating the first tool about the first axis;

(e) moving the first tool in an orbital motion about a third axis, wherein the third axis is separate from but parallel to the first axis, wherein the acts of rotating the first tool and moving the tool in an orbital motion are performed contemporaneously;

(f) advancing the first tool into the bore of the workpiece in a first pass to successively engage the cutting elements of the first tool with the workpiece to form a bore in the workpiece, wherein the formed bore has a third diameter and a bore length, wherein the first tool continues to rotate about the first axis and orbit about the third axis during the act of advancing the first tool;

(g) rotating the second tool about the second axis;

(h) moving the second tool in an orbital motion about the third axis, wherein the third axis is separate from but parallel to the second axis, wherein the acts of rotating the first tool and moving the tool in an orbital motion are performed contemporaneously; and (i) advancing the second tool into the bore of the workpiece in a second pass to successively engage the finish honing elements of the second tool with the formed bore in the workpiece to finish hone the bore to a fourth diameter, wherein the second tool continues to rotate about the second axis and orbit about the third axis during the act of advancing the second tool;

wherein the method is performed without a semi-finish boring pass being performed between the first pass and the second pass.

* * * * *